US005771482A

United States Patent [19]

Rizzoni

[11] Patent Number: 5,771,482
[45] Date of Patent: Jun. 23, 1998

[54] ESTIMATION OF INSTANTANEOUS INDICATED TORQUE IN MULTICYLINDER ENGINES

[75] Inventor: Giorgio Rizzoni, Upper Arlington, Ohio

[73] Assignee: The Ohio State University, Columbus, Ohio

[21] Appl. No.: 573,327

[22] Filed: Dec. 15, 1995

[51] Int. Cl.$^6$ .................................................. G06G 7/70
[52] U.S. Cl. .................... 701/101; 701/111; 701/110; 73/117.3; 73/116; 123/416; 123/435; 123/425
[58] Field of Search ...................... 364/431.03, 431.07, 364/431.08, 431.01, 550, 551.01, 431.061, 431.053; 73/117.3, 116, 115, 660; 123/479, 630, 425, 627, 655, 416, 435, 436, 492, 481, 419, 676, 417, 478; 324/388, 399, 379

[56] References Cited

U.S. PATENT DOCUMENTS

| | | | |
|---|---|---|---|
| 4,532,592 | 7/1985 | Citron et al. | 364/431.053 |
| 4,697,561 | 10/1987 | Citron | 123/436 |
| 4,843,870 | 7/1989 | Citron et al. | 73/116 |
| 5,044,195 | 9/1991 | James et al. | 73/117.3 |
| 5,193,513 | 3/1993 | Marko et al. | 123/571 |
| 5,200,899 | 4/1993 | Ribbens et al. | 364/431.08 |
| 5,216,915 | 6/1993 | Sakamoto | 73/117.3 |
| 5,222,393 | 6/1993 | Ohsawa | 73/117.3 |
| 5,239,473 | 8/1993 | Ribbens et al. | 364/431.08 |
| 5,241,480 | 8/1993 | Taksku et al. | 364/431.08 |
| 5,245,866 | 9/1993 | Hashiguchi et al. | 73/117.3 |
| 5,278,760 | 1/1994 | Ribbens et al. | 364/431.08 |
| 5,307,671 | 5/1994 | Akase | 73/117.3 |
| 5,343,844 | 9/1994 | Fukui et al. | 123/481 |
| 5,345,813 | 9/1994 | Flessas | 73/46 |
| 5,357,790 | 10/1994 | Hosoya | 73/117.3 |
| 5,359,518 | 10/1994 | Wimmer | 364/431.03 |
| 5,365,910 | 11/1994 | Miyata et al. | 123/627 |
| 5,373,732 | 12/1994 | Kuroda et al. | 73/117.3 |
| 5,377,537 | 1/1995 | James | 73/117.3 |
| 5,387,253 | 2/1995 | Remboski et al. | 73/117.3 |
| 5,388,560 | 2/1995 | Hisaki et al. | 123/630 |
| 5,394,742 | 3/1995 | Angermeier et al. | 73/117.3 |
| 5,396,176 | 3/1995 | Ishii et al. | 324/388 |

OTHER PUBLICATIONS

SAE Technical Paper Series, "Onboard Diagnosis of Engine Misfires", by William B. Ribbens & Giorgio Rizzoni, Sep. 17–20, 1990.

SAE Technical Paper Series, "Torque Nonuniformity Measurements in Gasoline Fueled Passenger Cars Equipped with Automatic Transmission–Theory & Experimental Results", by W.B. Ribbens & D. Gross, Feb. 24–28, 1986.

SAE Technical Paper Series, "Experimental Road Test of a Noncontacting Method of Measuring I–C Engine Torque Nonuniformity", by W. Ribbens, Feb. 25–Mar. 1 1985.

"Cylinder by Cylinder Engine Pressure and Pressure Torque Waveform Determination Utilizing Speed Fluctuations", by S. Citron, et al., pp. 131–145.

(List continued on next page.)

*Primary Examiner*—Jacques Louis-Jacques
*Attorney, Agent, or Firm*—Fay, Sharpe, Beall, Fagan, Minnich & McKee

[57] ABSTRACT

A method and apparatus for estimating instantaneous torque in an internal combustion engine includes a comprehensive model of internal combustion engine dynamics. Instantaneous net torque is estimated using a model which describes the relationship between engine indicated torque and crankshaft angular velocity. The first method and apparatus perform an explicit model inversion to solve for individual cylinder combustion torques. The second method and apparatus perform an implicit model inversion for reconstructing combustion torques produced by individual combustion events in an internal combustion engine. Unknown input observers are used in the implicit model inversion. The individual cylinder combustion torques are monitored as an indication of engine performance.

17 Claims, 13 Drawing Sheets

OTHER PUBLICATIONS

SAE Technical Paper Series, "Estimate of IC Engine Torque from Measurement of Crankshaft Angular Position", by G. Rizzoni and F. Connolly, Sep. 13–15 1993.

ASME Journal of Dynamic Systems, Measurement and Control, "Real Time Estimation of Engine Torque for the Detection of Engine Misfires", by F. Connolly and G. Rizzoni, Dec., 1994.

Kato et al: Model–based engine fault detection using pressure estimates from non lineart observers, IEEE, Dec. 1994.

Francis et al: Modeling and identification of the combustion pressure process in internal combustion engine, IEEE, Jan. 1994.

Rizzoni: A stochastic model for the indicated pressure process and the dynamics of the internal combustion engine, IEEE, Aug. 1989.

Rizzoni: Estimate of indicated torque from cranksahft speed fluctautions—A model for the dynamics of the IC engine, IEEE, Aug. 1989.

Rizzoni et al: Crankshaft position measurem,ent for engine testing, control, and diagnostics, IEEE, Jan. 1989.

Min et al: A vector space solution to incipient sensore failure detection with applications to automotive environments, IEEE, Aug. 1989.

Ha et al: Feedback linearization control of vehicle longitudinal acceleration, IEEE, Jul. 1989.

Rizzoni: Application of failure detection filters to the diagnostics of sensor andf actuator failutes in electronica;;y controlled engine. IEEE, Jan. 1988.

5,771,482

ESTIMATION OF INSTANTANEOUS INDICATED TORQUE IN MULTICYLINDER ENGINES

BACKGROUND OF THE INVENTION

1. Field of the Invention

This invention relates to methods and apparatus for estimating instantaneous torque based on a model of internal combustion engine dynamics and, in particular, to methods and apparatus for estimating instantaneous net torque using a model which describes the relationship between engine indicated torque and crankshaft angular velocity in a multicylinder engine.

2. Description of Related Art

Recent legislative requirements imposed by the State of California and by the Environmental Protection Agency demand the ability to conduct on-line diagnosis of internal combustion engine performance to ensure compliance with exhaust gas emissions regulations. For example, recent California Air Resources Board (CARB) regulations mandate continuous monitoring of misfires. In addition, the increasing demand to reduce such emissions requires the development of advanced control strategies, which could benefit from the availability of previously inaccessible measurements of variables tied to engine performance.

One such variable which provides an excellent indication of engine health, as well of its performance, is the indicated (or gas pressure, or combustion) torque generated by each cylinder as a result of the combustion process. However, the gas pressure variable cannot be directly measured, except by expensive techniques, which are only feasible in a laboratory setting.

A number of attempts have been made to detect or otherwise estimate instantaneous torque as a representation of engine performance. U.S. Pat. Nos. 5,200,899 and 5,239,473 to Ribbens, et al. suggest methods of detecting misfire conditions in an internal combustion engine. The methods and systems taught there exploit a measurement of engine crankshaft angular velocity in conjunction with hybrid electronic signal processing. Once an angular velocity signal is conditioned to minimize the effects of random error and external disturbances, four alternative computationally efficient methods are used to extract information pertaining to individual cylinder torque production. An M-dimensional torque non-uniformity vector is constructed to then determine a misfire condition in a one of the plurality of individual cylinders. Although the above patents shed some light on engine performance, they are not aimed at estimating engine torque, but rather, are limited to detecting misfire.

In U.S. Pat. No. 4,843,870, Citron, et al. construct a four degrees of freedom model of an engine-drivetrain system. The entire dynamics of the system, however, are lumped into four components which include only the engine, flywheel, vibration damper and the load. From this primitive model, Citron, et al. reconstruct an engine torque fluctuation waveform based on speed fluctuation data obtained from one or more angular velocity sensors placed in the system at one or more of the above mentioned four components. An engine pressure torque fluctuation waveform is obtained by subtracting the engine inertial torque from the engine torque giving inertial torque as a function of crank angle, crankshaft speed and engine geometry. An engine pressure torque waveform is formed utilizing the mean engine torque determined from the pressure torque fluctuation waveform from which the cylinder pressure waveform is determined.

Although the Citron, et al. patent identified above teaches a reconstruction of engine input torque from measurements of engine angular velocity at one or more points on either end of the crankshaft, it fails to recognize that the crankshaft is a rather flexible body in certain engines, particularly in multicylinder engines, and merely treats the crankshaft as a single rigid body. This prior patent does not address the complexities introduced by the fact that in some engines the torsional dynamics of the crankshaft are extreme and must be taken into account when reconstructing engine torque.

SUMMARY OF THE INVENTION

The present invention contemplates new and improved methods and apparatus for estimating instantaneous net torque in a multicylinder internal combustion engine. The instant invention takes into account the various dynamics associated with flexibility in crankshafts previously ignored in the prior art.

The first method and apparatus of the present invention performs an explicit model inversion to solve for individual cylinder combustion torques. The method includes the steps of obtaining a first set of measured outputs Y(s) from a crankshaft of an internal combustion engine. Preferably, the first set of measured outputs are obtained by determining the instantaneous angular velocity of the crankshaft at a first set of preselected points along the crankshaft. Next, a dynamic mathematical model H(s) of the crankshaft of the internal combustion engine is provided. The mathematical model relates a first set of net engine input torques X(s) to a first set of outputs Y(s) of the internal combustion engine. Lastly, a first set of net engine torques $\hat{X}(s)$ is reconstructed by inverting the mathematical model H(s) and applying the first set of measured outputs $\hat{Y}(s)$ according to $\hat{X}(s)=H^{-1}(s)Y(s)$.

The second preferred method of the present invention performs an implicit model inversion for reconstructing combustion torques produced by individual combustion events in an internal combustion engine. The method includes the steps of obtaining a first set of measured outputs from a rotating member in an internal combustion engine, providing a dynamic mathematical model of an engine rotating assembly of the internal combustion engine, the mathematical model relating a first set of net individual cylinder torques to a first set of outputs of the internal combustion engine and, reconstructing a first set of estimated net individual cylinder torques by implicitly inverting said mathematical model by means of an input observer or estimator to obtain an estimate of the input torques.

Accordingly, it is a general object of the present invention to provide an improved modeling of an internal combustion engine and an improved estimation of instantaneous indicated torque of the engine using that model.

Another object of the present invention is to provide an improved apparatus for obtaining a set of instantaneous angular positions, angular velocities, angular torques, angular acceleration or shaft torque measures of the crankshaft of an internal combustion engine and determining an estimation of instantaneous indicated torque in the multicylinder engine using the obtained measures.

These and other objects and advantages of the present invention will become apparent to those skilled in the art upon a reading an understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENT

Figure 1:
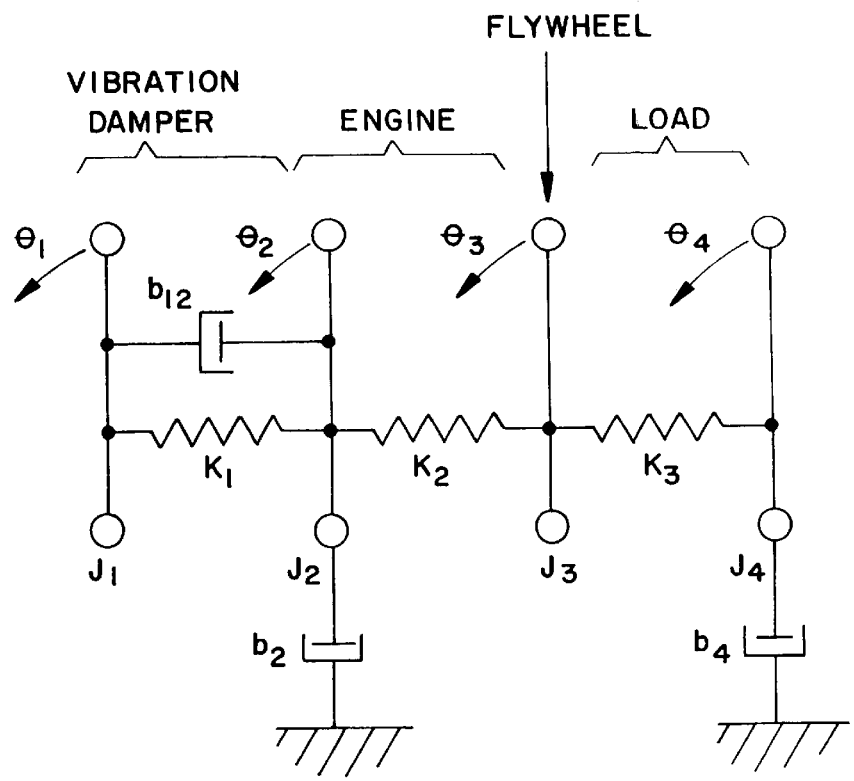
FIG. 1 is a prior art schematic diagram model of an engine-drivetrain-load combination of a vehicle.

Referring now to the drawings, there is illustrated in FIGS. 2–8 methods and apparatus for estimating instantaneous indicated torque in a multi-cylinder engine according to the preferred embodiments of the present invention. As will become apparent in the following detailed descriptions, the illustrated example of the first preferred method is based on a sixteen (16) cylinder vee "V" configuration diesel engine and will be described with particular reference thereto. A second preferred method of estimating instantaneous net torque will be described in connection with an in-line six (6) cylinder engine. However, it is to be understood that the methods set forth below are easily adapted for application in any internal combustion engine configuration without departing from the spirit and scope of the instant invention.

Before the preferred methods and apparatus of the present invention are set forth, it is helpful to first examine in detail one exemplary prior art technique previously used to model an internal combustion (IC) engine. FIG. 1 illustrates an early engine-drivetrain system model used to derive the equations governing the motion of an overly simplified engine system. With reference to that FIGURE, four (4) inertias are used in the model including that of the vibration damper $J_1$, the engine $J_2$ including the crankshaft and the connecting rods, the flywheel $J_3$, and the vehicle or load inertia $J_4$. Three torsional parameters $k_1$, $k_2$ and $k_3$ join these "lumped" inertias. The model includes damping between the engine vibration damper $b_{12}$, between the engine and a datum point $b_2$, and between the load and the datum point $b_4$. This is a basic four-degree-of-freedom model.

By sensing the crankshaft speed of rotation and using the model of FIG. 1, it is possible to obtain a net engine torque waveform from which a cylinder pressure waveform may be obtained. However, in order to account for the complexities introduced into the system by the torsional dynamics of the crankshaft, a more accurate, and therefore complex, model is necessary for reconstructing a more precise engine torque measurement. Overall, the model set forth in FIG. 1 fails to recognize that the crankshaft is a flexible body. This is critical in large multi-cylinder engines, such as those having more than four (4) cylinders, as the torque events can become masked by the dynamics of the crankshaft and the associated inertias.

Figure 2:
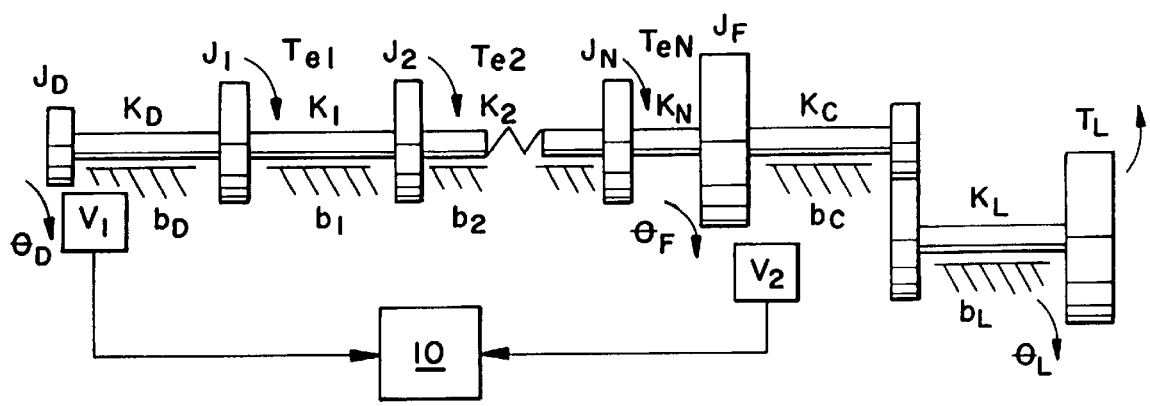
FIG. 2 is a schematic diagram preferred model of an internal combustion engine, drivetrain, and load combination according to the present invention.
Figure 2A:
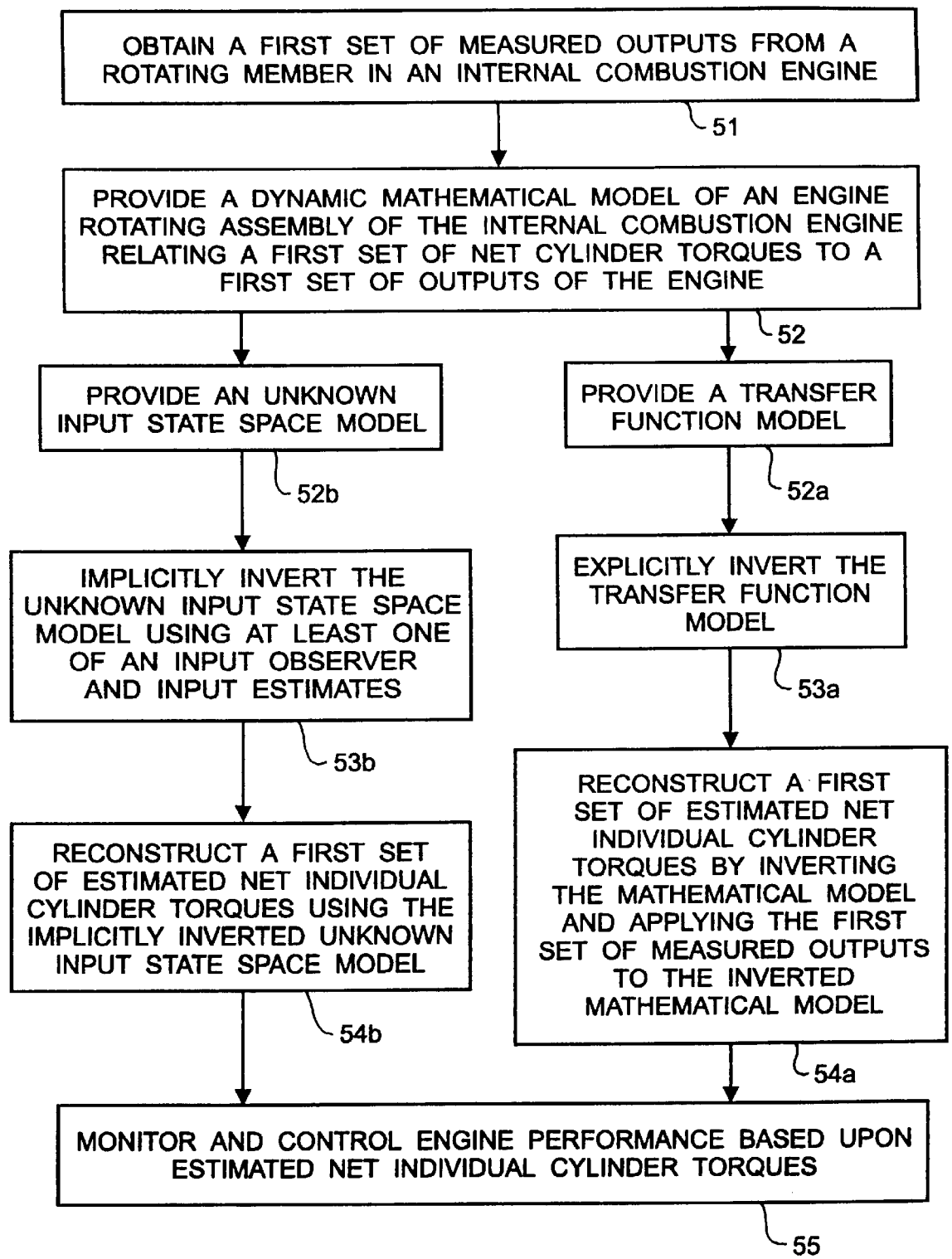
FIG. 2a is a flow chart illustrating the preferred torque estimation methods of the present invention.

With reference now to FIGS. 2 and 2A the preferred dynamic mathematical model and method for a generic engine/drivetrain combination are shown. The detailed model set forth in FIG. 2 is used in the preferred methods of FIG. 2a to relate instantaneous engine angular velocity to the torque applied to the crankshaft by each piston on a per cylinder basis.

In the model of FIG. 2, $J_1$–$J_N$ represent the rotating inertias corresponding to each cylinder in an in-line engine configuration or each cylinder pair in a "vee" configuration. Preferably, these inertias do not include the crank angle-dependent inertia of the reciprocating piston/rod assembly in order to preserve model linearity. This term, however, is accounted for later in the reciprocating inertia torque term described below. The inertia of the harmonic damper, if present, is represented by $J_D$. The designations $J_F$ and $J_L$ represent the flywheel and load inertias, respectively.

The parameters $k_1$–$k_N$ in the preferred model represent the equivalent stiffness of the crankshaft between throws, while $k_D$ and $k_C$ represent the stiffness of the coupling between the crankshaft and the damper, and of the coupling between the flywheel and the transmission input shaft, respectively. The stiffness parameter, $k_L$, represents the elastic coupling between the transmission output shaft and the load.

The damping terms in the preferred model are indicated by the symbol b, and are treated in much the same way as the equivalent damping stiffness parameters described above. As an example, the damping between the first and second crankshaft throws is represented by the symbol $b_1$.

For practical reasons, the preferred measure system outputs S1 (FIG. 2a) are limited to the velocities at the harmonic damper $\omega_D$, the flywheel $\omega_F$ and at the load $\omega_L$. These are given by the following expressions respectively:

$$\omega_D = \frac{d\theta_D}{dt}, \omega F = \frac{d\theta_F}{dt}, \text{ and } \omega_L = \frac{d\theta_L}{dt}.$$

However, as understood by those skilled in the art, other system outputs may be used such as points along the drivetrain including drive shaft, axles or ABS rotor/sensor device. Also, system outputs at a plurality of crankshaft main journal points are also possible, though less practical.

In the present invention, the angular velocities are obtained substantially as set forth in U.S. Pat. Nos. 5,200,899 and 5,239,473, both incorporated herein by reference. FIG. 2 schematically illustrates a net torque estimating apparatus including a pair of angular velocity sensors $V_1$ and $V_2$ disposed at the harmonic damper and flywheel respectively. Each of the sensors are connected to a system monitoring unit 10 which includes the necessary buffering and processing resources to effect the torque estimation method described below. Basic programmable system monitoring units are readily available and are well known in the control and signal processing arts.

Although the preferred embodiment is described here in connection with angular velocity measurements, those skilled in the art will appreciate that other outputs from the rotating members of an internal combustion engine may be used. As an example, crankshaft angular position, angular torque, angular acceleration and differential shaft torque measurements provide ready and equivalent substitutes. In those cases, the angular velocity sensors $V_1$ and $V_2$ would be replaced with suitable crankshaft angular position, angular torque, angular acceleration or differential shaft torque sensors, respectively.

The system inputs are the torques acting at each crank throw, represented by $T_1$ through $T_N$. These torques are modelled as the net torque applied at each crank throw, and therefore includes the sum of the indicated, reciprocating inertia, friction, and pumping loss torques. Thus:

$$T_{en} = T_{in} - T_{rn} - T_{fpn}$$

where:
- $T_{en}$ represents the net torque of the $n^{th}$ cylinder or cylinder pair for engines of vee "V" configuration;
- $T_{in}$ represents the indicated torque of $n^{th}$ cylinder or cylinder pair;
- $T_{rn}$ represents the torque associated with inertia of reciprocating components at $n^{th}$ crank throw; and,
- $T_{fpn}$ represents the torque loss associated with piston/ring friction and pumping losses of $n^{th}$ cylinder or cylinder pair.

These N input torques act on the engine rotating dynamics, and are opposed by a load torque, $T_L$.

In the preferred model embodiment, the reciprocating inertia torque is treated as an external input. This permits modelling the crankshaft by means of constant distributed lumped inertias, and allows for a linear representation of what would otherwise be an intrinsically nonlinear model due to the kinematics of the crankshaft slider mechanism.

For the purposes of slightly simplifying the preferred detailed model illustrated, the drivetrain, differential, and the instantaneous speed at the drive axles are not included. However, such modelling is straightforward and may be included when necessary or desired as understood by those skilled in the art.

The transmission is represented by an ideal gear ratio. For simplicity, the transmission losses are lumped as a single damping parameter $b_c$. Many effects which influence the relationship between engine torque and crankshaft angular motion may easily be added to the model of FIG. 2. Depending on whether the engine is coupled to the driveline by a manual or automatic transmission, or whether the engine is to be used for purposes other than automotive, the dynamics of the transmission will vary with application. These extensions are straightforward to those skilled in the art. Further, it is likely that a number of nonlinearities enter into the system, especially in modelling the transmission and when the driveline includes torsional damping elements. The preferred model of FIG. 2 does however capture the essence of the dynamic system, and is quite adequate without the above-identified added complexities for the purpose of estimating engine torque from multiple measurements of crankshaft angular velocity, as will be shown below.

With reference also to FIG. 2a, having established a preferred dynamic mathematical model of an engine rotating assembly of an internal combustion engine S2, the model must be inverted S3a, S3b and the measured outputs applied thereto S4a in order to obtain an estimation of the input signals. Since the preferred dynamic mathematical model described above relates a first set of net individual cylinder torques to a first set of measured outputs of the internal combustion engine, application of the measured outputs to the inverted model S4a results in estimated net individual cylinder torques for use in engine performance evaluation, monitoring or control S5.

The present invention contemplates both explicit model inversion techniques S3a and implicit model inversion techniques S3b. In both embodiments, apparatus such as illustrated in FIG. 2 and described in U.S. Pat. Nos. 5,200,899 and 5,239,473 incorporated herein are used to estimate net torque, ie. useful work, produced by the engine. Each of the preferred methods will be described below in turn. The explicit model inversion method and apparatus will be demonstrated in connection with a v-16 engine. The implicit model inversion method and apparatus will be described using an in-line six (6) cylinder engine.

METHOD I

EXPLICIT MODEL INVERSION

In general, linear systems can be completely described by the input-output relationship known as the convolution integral $$y(t) = \int_{-\infty}^{\infty} u(\tau)h(t-\tau)d\tau$$

where u(t) is the input, y(t) the output, and h(t) the system impulse response function. For the system shown in FIG. 2, the system impulse response function is time-invariant. The generic linear system may be either single-input, single-output (SISO) or multiple-input, multiple-output (MIMO). Francis T. Connolly and Giorgio Rizzoni demonstrated the ability to detect misfires assuming a SISO system in Real Time Estimation of Engine Torque for the Detection of Engine Misfires in *Proc. of Second ASME Symp. on Advanced Automotive Technologies*, ASME Winter Annual Meeting, Atlanta, Ga., Dec. 1–6, 1991 incorporated herein by reference. The present invention uses the MIMO model.

Figure 3:
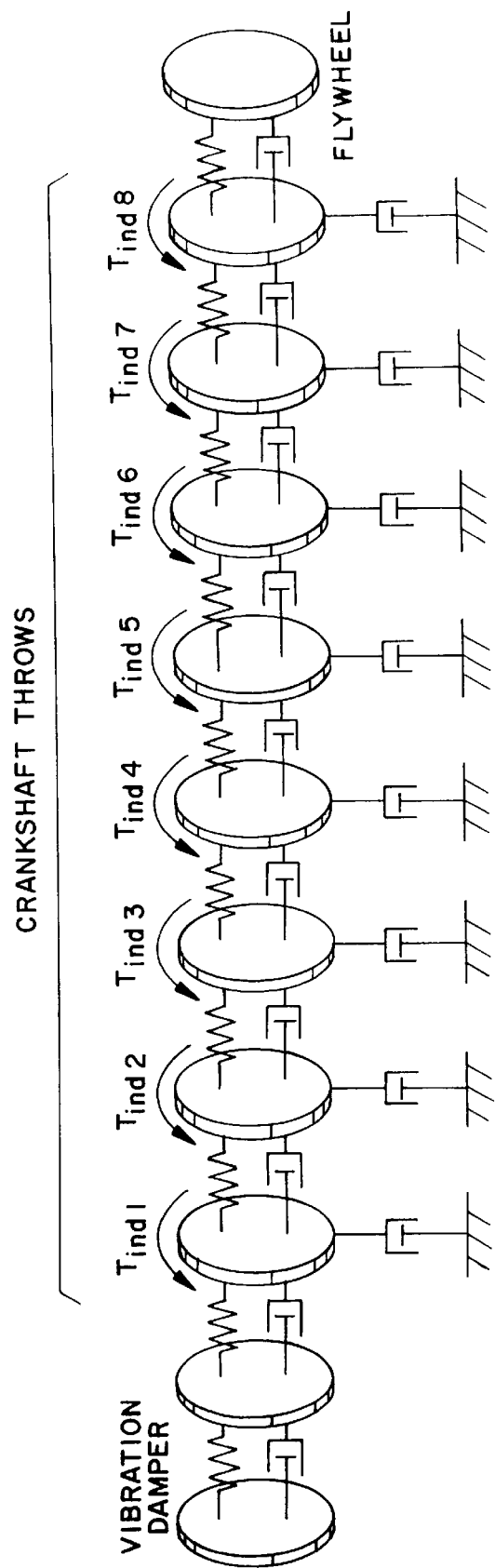
FIG. 3 is a lumped inertia mathematical model of a sixteen cylinder vee "V" configuration engine.

FIG. 3 shows a lumped inertia mathematical model of a sixteen cylinder engine with a vibration damper on a first end of a crankshaft and a flywheel attached at the other end. The distributed model inertias, which each represent the effective rotational moment of inertia at each crankshaft throw, are connected via elastic springs and viscous damping components. Such a model with time invariant parameter values is preferably represented by the linear MIMO input/output relationship mentioned above and described below in detail. The inputs are considered to be the torques $T_{indp}(t)$ where p indicates crank throw number, acting on the individual crank throw inertias. The outputs may be considered to be any relevant quantities of interest within the model structure. In the preferred embodiment, the outputs are the angular velocities which are measured by suitable sensors placed at one or more selected crank throws, the inner damper, or at the flywheel.

Figure 4:
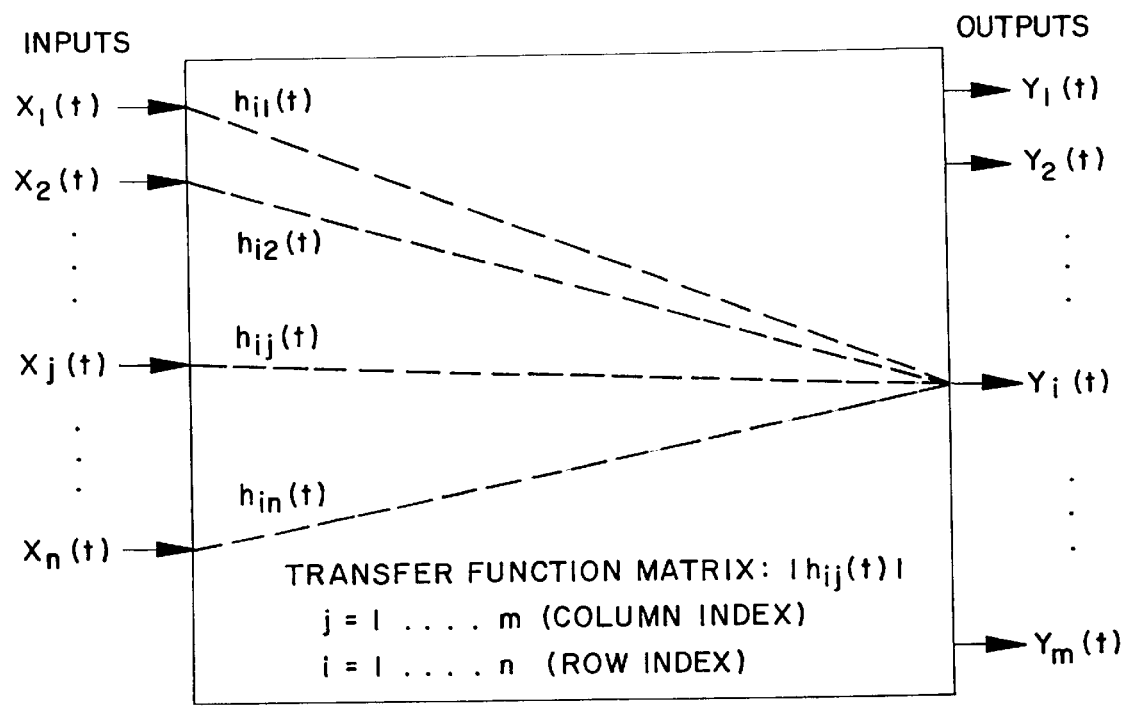
FIG. 4 is a pictorial representation of a linear time invariant multiple input, multiple output system illustrating the input/output relationship of the model in FIG. 3.

According to the present invention and with reference now to FIG. 4, the first step to finding the indicated torque in each cylinder of a given IC engine is to represent the Linear Time-Invariant (LTI), Multiple-Input, Multiple-Output (MIMO) system of the engine by its unique impulse response matrix $[h_{ij}(t)]$, where $h_{ij}(t)$ is the scalar valued impulse response function relating input j, $x_j(t)$, to output i, $y_i(t)$, j=1, . . . , n and i=1, . . . ,m.

Output i, $y_i(t)$, is the sum of the responses from all of the inputs to this output port according to:

$$y_i(t) = \sum_{k=1}^{n} \int_{-\infty}^{t} x_k(\tau) h_{ij}(t-\tau) d\tau.$$

The above relation holds true for each output, i.e., i=1, . . . ,m. These m equations may be written equivalently in matrix form:

$$y(t) = \int_{-\infty}^{t} x(\tau)[h_{ij}(t-\tau)] d\tau$$

where $x(t)$ and $y(t)$ are n×1 and m×1 columns of input and output time functions, respectively. This input-output relationship is represented pictorially in FIG. 3.

Taking the Laplace transform of the above equation yields the expression:

$$Y(s) = H(s)X(s)$$

where $X(s)$ and $Y(s)$ are n×1 and m×1 columns of input and output functions, respectively, of the frequency variable s in the frequency domain, $H(s)=[H_{ij}(s)]$ is the transfer function matrix, $H_{ij}(s)$ is the scalar transfer function from input i to output j, $s=\sigma+j\omega$ is the complex valued frequency variable, and $j=(-1)^{1/2}$. Given a state-space representation {A, B, C, D} of the above LTI-MIMO system, transfer function matrix H(s) is computed from $$H(s) = C(sI-A)^{-1}B + D.$$

As an example, for a 2-Input, 4-Output system, that is, an engine with 2 piston assembly inertias as inputs (two cylinder or V-4) with flywheel, damper, and 2 inertial speeds sensed by a pair of transducers as the outputs, the following model form applies:

$$\begin{bmatrix} H_{11}(s) & H_{12}(s) \\ H_{21}(s) & H_{22}(s) \\ H_{31}(s) & H_{32}(s) \\ H_{41}(s) & H_{42}(s) \end{bmatrix} \begin{bmatrix} X_1(s) \\ X_2(s) \end{bmatrix} = \begin{bmatrix} Y_1(s) \\ Y_2(s) \\ Y_3(s) \\ Y_4(s) \end{bmatrix}.$$

At a single particular frequency, the complex valued frequency variable assumes a single value $s_k = j2\pi f_k$, where $f_k$ is the frequency parameter in units of cycles (Hz). Also, the input vector, output vector and transfer function matrix $X(s_k)$, $Y(s_k)$, and $H(s_k)$ assume particular values:

$$\begin{bmatrix} H_{11} & H_{12} & \ldots & H_{1n} \\ H_{21} & H_{22} & \ldots & H_{2n} \\ \ldots & \ldots & \ldots & \ldots \\ H_{m1} & H_{m2} & \ldots & H_{mn} \end{bmatrix} \begin{bmatrix} X_1 \\ X_2 \\ \ldots \\ X_n \end{bmatrix} = \begin{bmatrix} Y_1 \\ Y_2 \\ \ldots \\ Y_M \end{bmatrix}_{s=s_k},$$

or, in matrix notation:

$$Y_{s_k} = H_{s_k} X_{s_k}$$

Providing that the transfer function matrix at the particular frequency $H_{s_k}$ is invertible (i.e., square and non-singular), the output vector $X_{s_k}$ is computed given $Y_{s_k}$ and $H_{s_k}$ from $$X_{s_k} = H_{s_k}^{-1} Y_{s_k}$$

where $H_{s_k}^{-1}$ is the matrix inverse of $H_{s_k}$.

Under other conditions (e.g., $H_{sk}$ singular or non-square) $X_{sk}$ may be computed given $Y_{sk}$ and $H_{sk}$ using a matrix pseudo-inverse $H_{sk}^+$ of $H_{sk}$, where, in general, $H_{sk}^+$ satisfies $$H_{s_k} H_{s_k}^+ = H_{s_k}.$$

In this unusual case of a singular or non-square matrix, the output vector is computed according to:

$$\hat{X}_{s_k} = H_{s_k}^+ Y_{s_k}$$

where $\hat{X}_{s_k}$ is not necessarily equal to $X_{s_k}$, and is an acceptable estimate in most cases.

The modeling in the preferred embodiment assumes that X(t) is composed as a vector of engine input indicated torque waveforms $T_{ind_p}(t)$, where p=1, . . . ,n, and where n is the number of engine cylinders for in-line situations or cylinder combinations such as in a "vee" configuration. The model also assumes that Y(t) is composed of a vector of measured engine output waveforms, more particularly, engine angular velocities measured at points distributed along the crankshaft. The transfer function matrix H(s) defines the relationship between X(t) and Y(t) and forms a distributed inertia model representing a flexible crankshaft composed of the multiple inertias of the engine inter-connected by elastic and damping elements.

This being the case then, $X_{s_k}$ or $\hat{X}_{s_k}$ are used to compute a set of estimated frequency components $\{\hat{X}(s_k)\}$ of x(t) from frequency components $\{Y(s_k)\}$ of measured y(t) at a suitable set of frequencies $\{s_k\}$. These estimated frequency components $\{\hat{X}(s_k)\}$ are then used in an inverse Fourier transform in order to reconstruct an estimate of the input torques $\hat{x}(t)$.

At steady-state engine speed, the indicated torque waveforms $T_{ind_p}(t)$ forming the element functions of the vector x(t) are periodic with period $T_c$ which is equal to one engine cycle. Further, these indicted torque waveforms are band-limited in frequency.

Figure 5A:
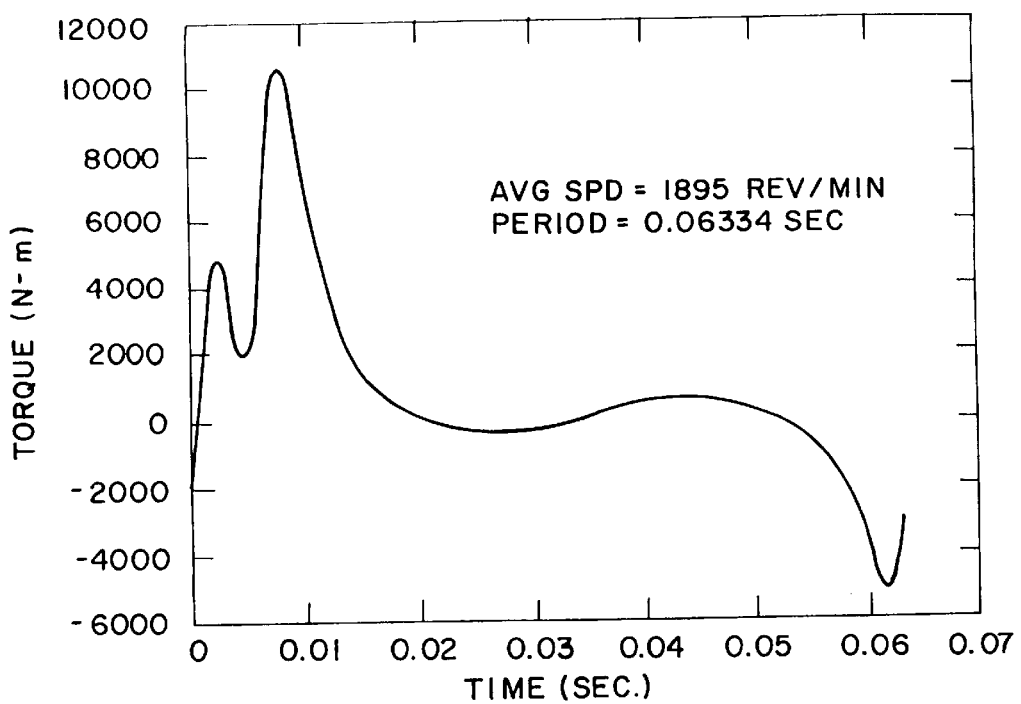
FIGS. 5a and 5b are respective exemplary graphs of an indicated torque waveform and a Fourier Series spectrum of the torque waveform.
Figure 5B:
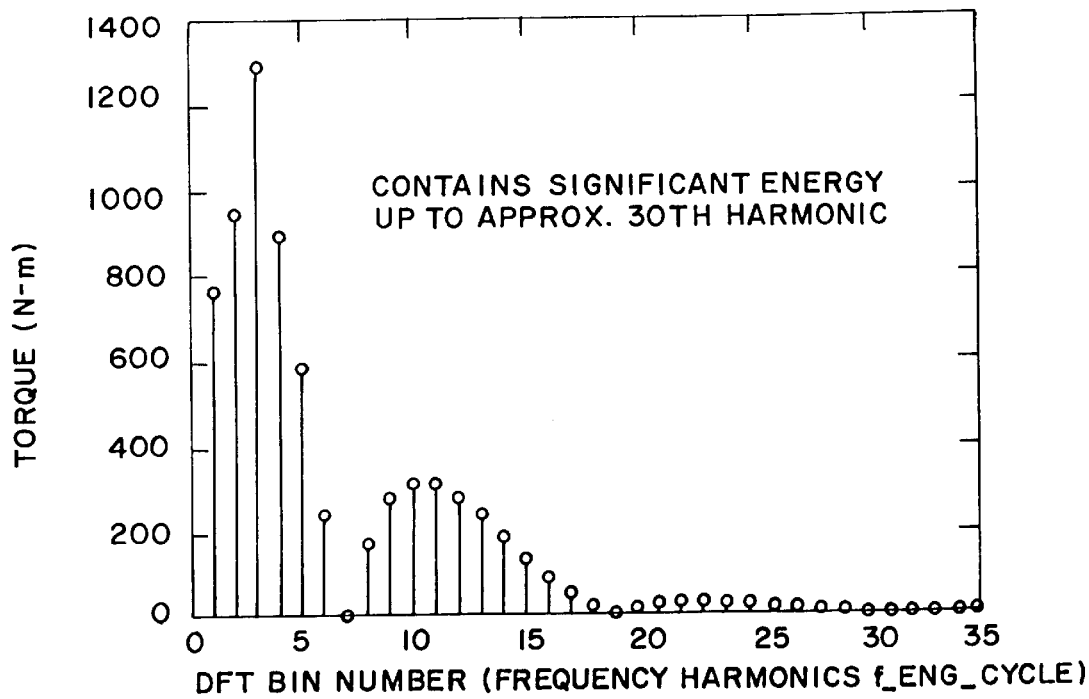

FIGS. 5a and 5b show a typical torque input waveform and a Fourier Series spectrum of the typical waveform, respectively. In FIG. 5a, the waveform is composed of the sum of the indicated torque waveforms from two cylinders acting on the same crankshaft throw. The Fourier Series spectrum is illustrated in FIG. 5b.

The spectrum of $T_{ind_p}(t)$ for a single cylinder is similar to that illustrated in FIG. 5b and contains frequency components of significant energy in the same frequency band as shown there. Therefore, the $T_{ind_p}(t)$ waveforms are preferably approximated to an arbitrary accuracy by a finite set of frequency components $\{T_{ind_p}(ks_c)\}$ at integer harmonics of the engine cycle fundamental frequency $s_c=2\pi f_c$. The spectrum $T_{ind_p}(t)$ contains significant energy only up to some arbitrary harmonic $Kf_c$ of $f_c$, where K is an integer. This set of frequencies $\{f_k | k=1, \ldots, K\}$ will be referred to hereinafter as the frequencies of interest.

Next, according to the instant invention, estimates $\hat{T}_{ind_p}(t)$ of the input torque $T_{ind_p}(t)$ waveforms are reconstructed via the Fourier Series using the estimated $\{\hat{T}_{ind_p}(ks_c)\}$ frequency components. These components $\{\hat{T}_{ind_p}(ks_c)\}$ are preferably estimated from the components of the measured output waveforms at the frequencies of interest using, for example, the above equations for $X_{sk}$ or $\hat{X}_{sk}$.

It is to be noted that the engine cycle fundamental frequency $f_c$ changes with average engine speed, and thus so too will the frequencies of interest. In the preferred embodiment, a look up table is used to relate engine speed with the particular frequencies of interest at that speed.

Frequency components at the frequencies of interest are computed using the Discrete Fourier Transform (DFT), or more properly, the Discrete Fourier Series (DFS). The Fourier Series coefficients of a continuous time periodic signal $T_{ind_p}(t)$ band-limited to frequency $Kf_c$ and with period $T_c$ $1/f_c$ are $$\tau_{ind_p}(k) = \frac{1}{T_c} \int_0^{T_c} T_{ind_p}(t)\, e^{-j2\pi k f_c t} dt, \quad k = 0, \pm 1, \ldots \pm K.$$

The Fourier Series coefficients $T_{ind_p}(k)$ are preferably approximated using the DFS provided that the sampling interval $T_s$ is chosen appropriately to prevent aliasing. Also, $T_s$ is chosen so that $N=T_c/T_s$ is an integer. Then:

$$\tau_{ind_p}(k) \approx \frac{1}{N} \sum_{n=0}^{N-1} T_{ind_p}(nT_s)\, e^{-jkn\frac{2\pi}{N}}, \quad k = 0, 1, \ldots, K,$$

where the summation component in the above equation is the DFS of $T_{ind_p}(nT_s)$ at frequency $2\pi k f_c$. Since $T_{ind_p}(t)$ is real-valued, $\tau_{ind_p}(-k) = \tau^*_{ind_p}(k)$ where * denotes complex conjugate. The DFS is a numeric integration that is preferably used to approximate the Fourier Series for a continuous time signal.

Lastly, the reconstructed waveforms $\hat{T}_{ind_p}(t)$ are then computed from estimated frequency components $\hat{\tau}_{ind_p}(t)$ using the Fourier Series:

$$\hat{T}_{ind_p}(t) = \sum_{\substack{k=-K \\ K \neq 0}}^{K} T_{ind_p}(k)\, e^{j2\pi k f_c t}.$$

The average value term at k=0 cannot be included in the preferred MIMO model as this case is not invertible at s=0.

The preferred method of obtaining the estimated torque waveform $\hat{T}(\lambda)$ is illustrated conceptually in FIGS. 6a–6e. As described above, a plurality of angular velocity measurements are sampled from the IC engine S1 (FIG. 2a). For the purposes of discussion here, a crankshaft damper angular velocity $\omega_d(\theta)$ and a flywheel velocity $\omega_f(\theta)$ is obtained, where the parameter $\theta$ represents crankshaft angle. Next, in FIG. 6b, a discrete Fourier transform is performed on the angular velocity waveforms $\omega_d(\theta)$, $\omega_f(\theta)$ to realize a discrete angular velocity vector $\omega(\lambda)$ in terms of events per engine cycle $\lambda$. The series is truncated to include only those harmonics of engine cycle containing sufficient signal energy, e.g. 98%.

Figure 6A:
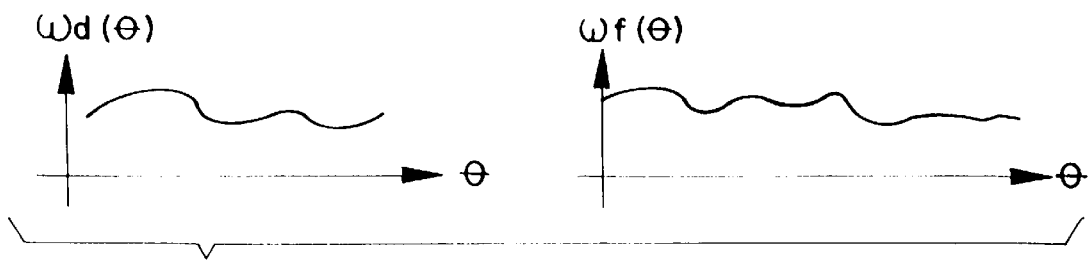
FIGS. 6a–6e conceptually illustrate the first preferred method for estimating instantaneous indicated torque in a multicylinder engine using an explicit model inversion.
Figure 6B:
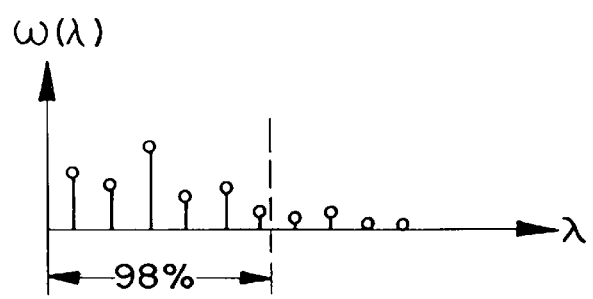
Figure 6C:
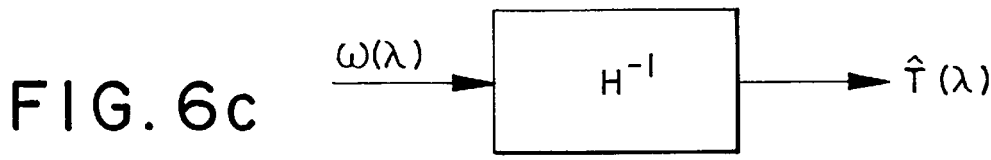
Figure 6D:
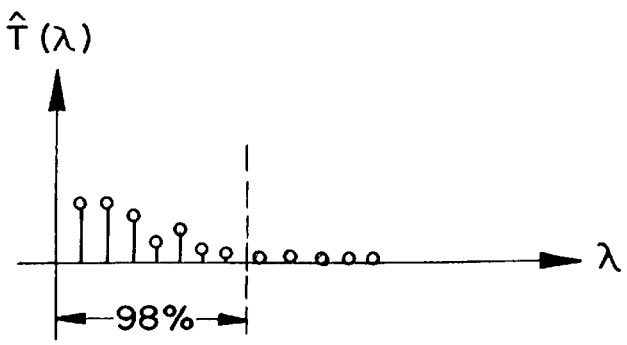

In FIG. 6c, the truncated discrete angular velocity series $\omega(\lambda)$ is processed through the inverted engine transfer function matrix $H^{-1}$ (FIG. 2a, S2a–S4a) to realize a discrete torque vector $\hat{T}(\lambda)$ in terms of events per engine cycle shown in FIG. 6d. The discrete torque vector $\hat{T}(\lambda)$ is truncated to include a spectrum of estimated torque having sufficient signal energy above a predetermined threshold e.g. 98%.

Figure 6E:
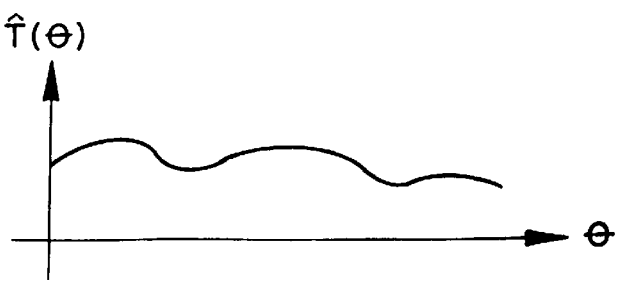
Figure 7A:
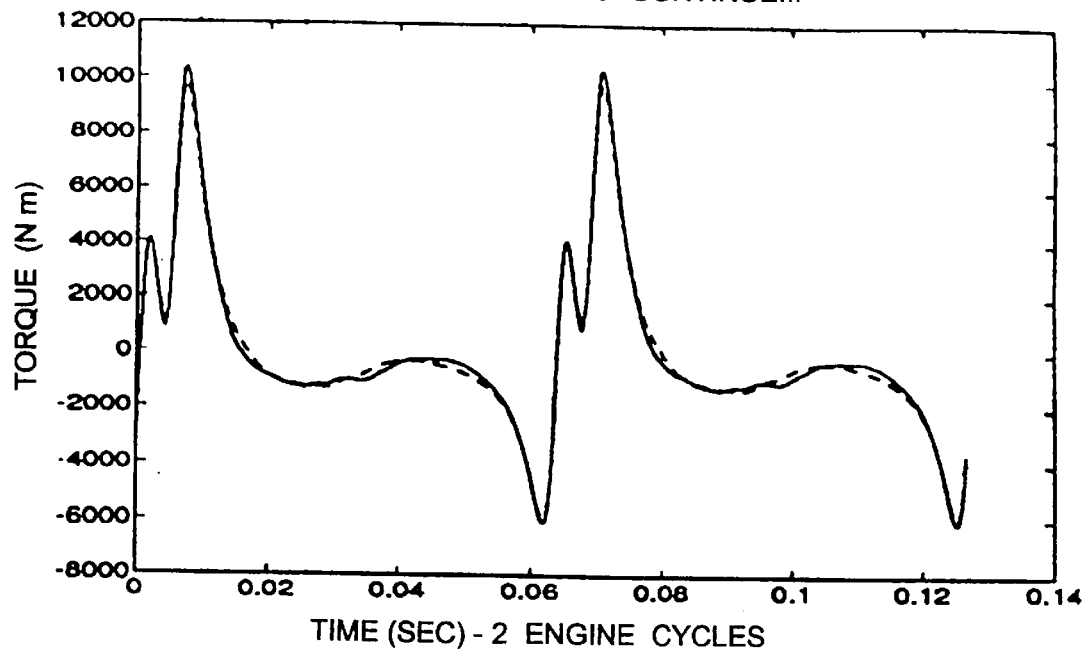
FIGS. 7a–7h are a set of input-output model simulation waveforms derived from the system illustrated in FIGS. 3 and 4.
Figure 7B:
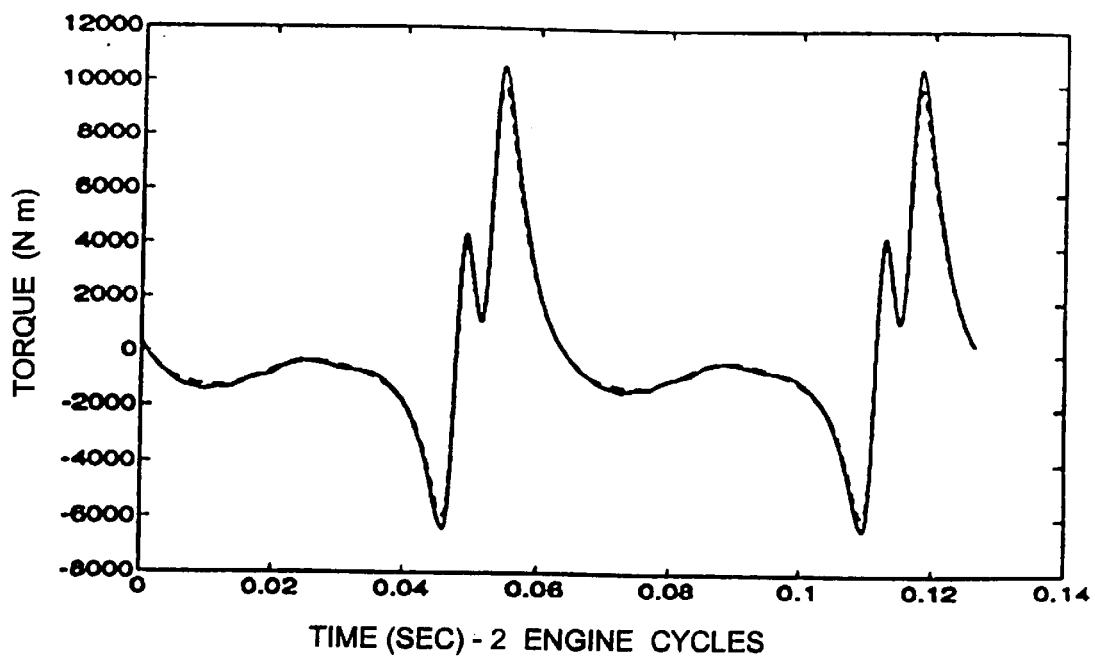
Figure 7C:
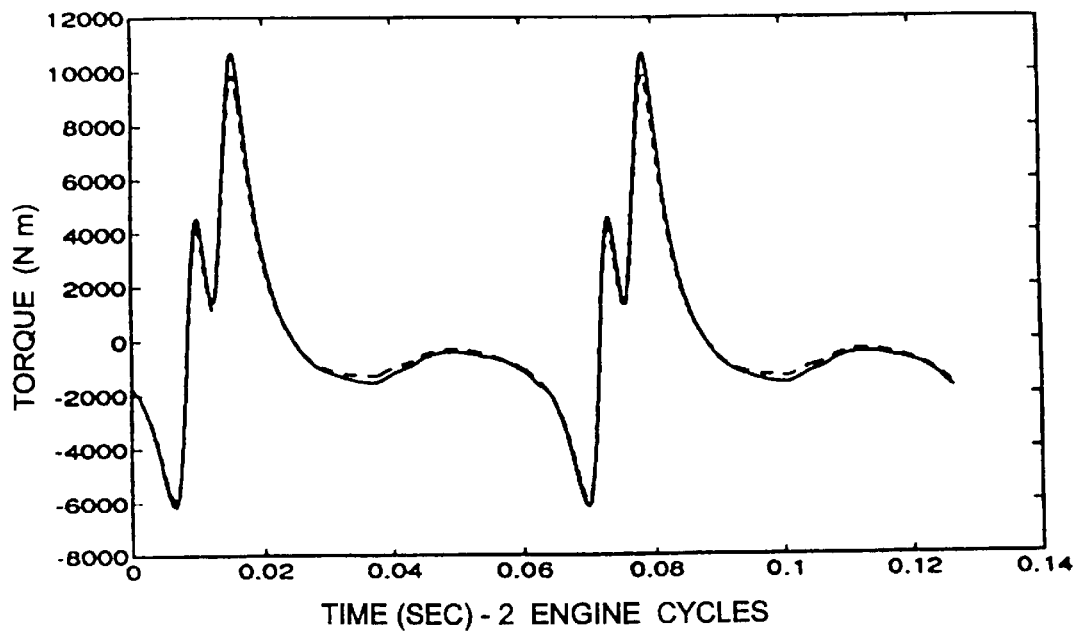
Figure 7D:
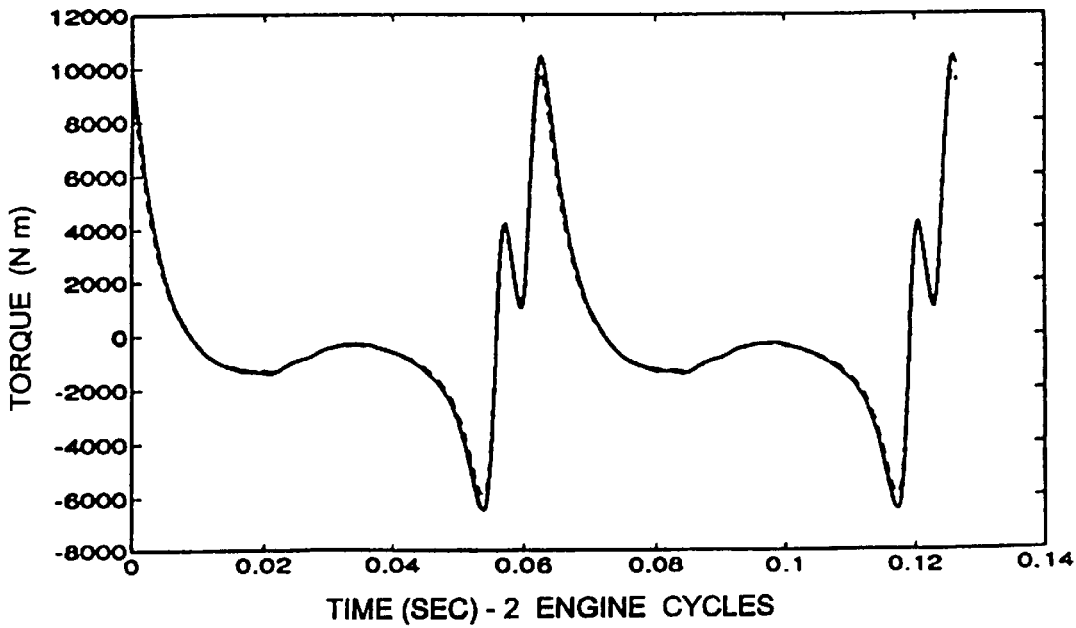
Figure 7E:
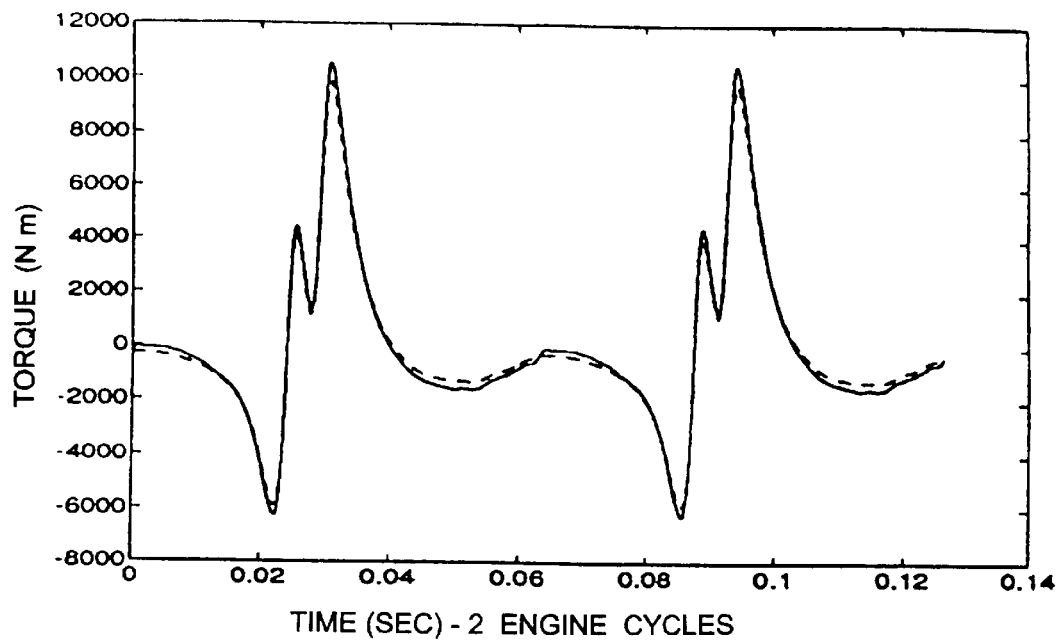
Figure 7F:
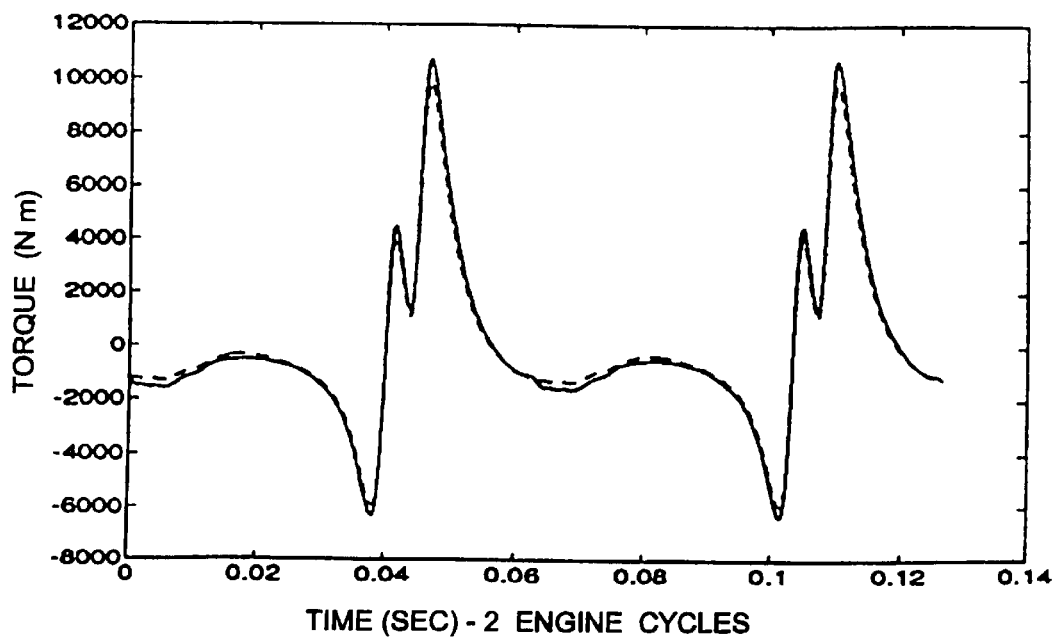
Figure 7G:
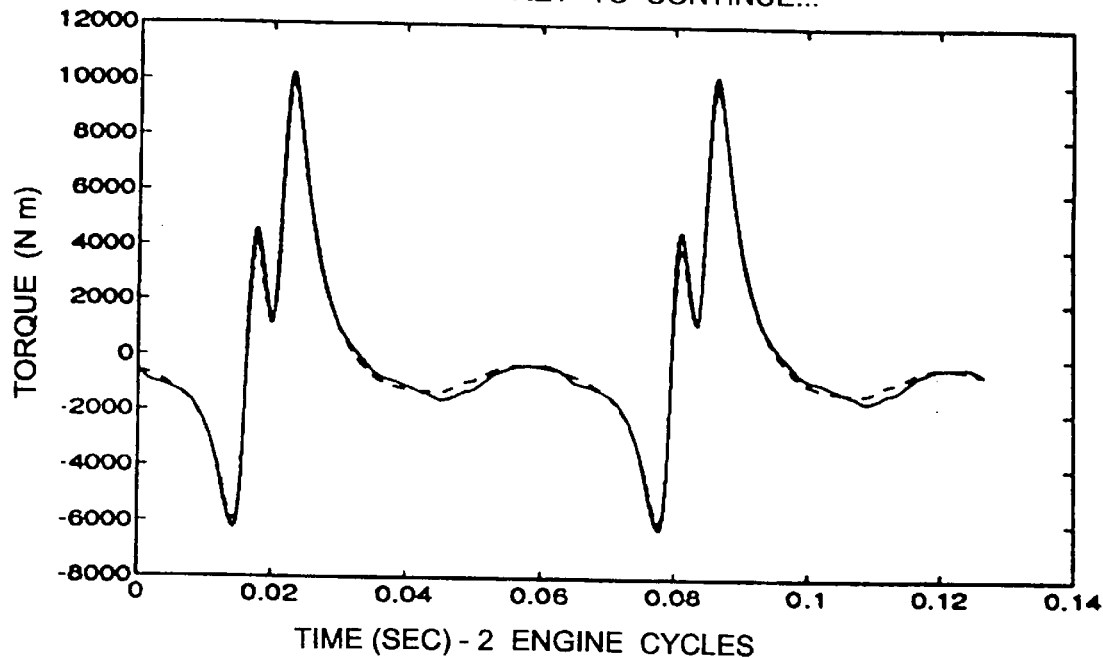
Figure 7H:
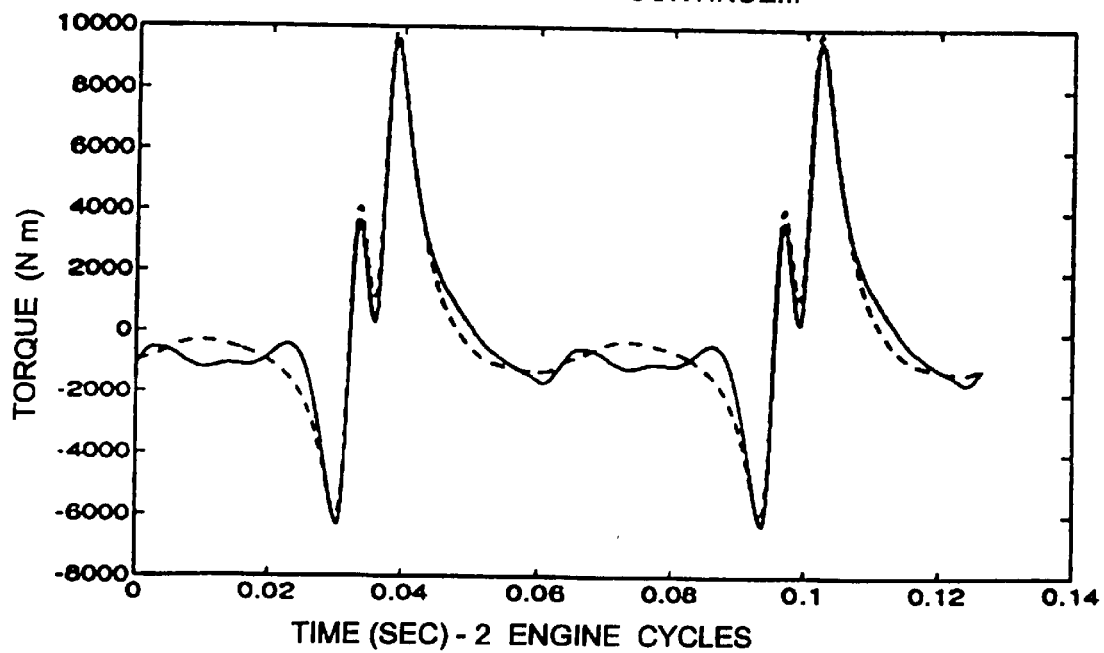

Lastly, if desired, the truncated discrete torque $\hat{T}(\lambda)$ is processed through an inverse discrete Fourier transform to realize an estimated torque waveform $\hat{T}(\theta)$ shown in FIG. 6e.

FIGS. 7a–7h illustrate input waveforms in dashed lines used in a simulation of an eight crankshaft throw inertia MIMO model plotted against input waveforms in solid lines reconstructed using the preferred method discussed above. Each of the eight input waveforms are the sum of two indicated torque waveforms acting on the same crankshaft throw such as in the V-16 engine of FIG. 3. The outputs of the model are the angular speeds of the eight crank throw inertias along with the angular speeds of the inner (right, in the FIG. 3) damper inertia and flywheel inertia.

METHOD II

IMPLICIT MODEL INVERSION

An alternative approach to estimating engine torque through crankshaft speed fluctuations without using an inverse model explicitly, is to formulate a closed-loop structure, similar to a tracking control problem, to perform the estimation. Such an approach offers the advantage of being amenable to real-time implementation. According to this preferred embodiment of the invention, torque estimation is performed for general cases of multi-cylinder engines using an implicit model inversion S2b–S4b (FIG. 2a).

Figure 8:
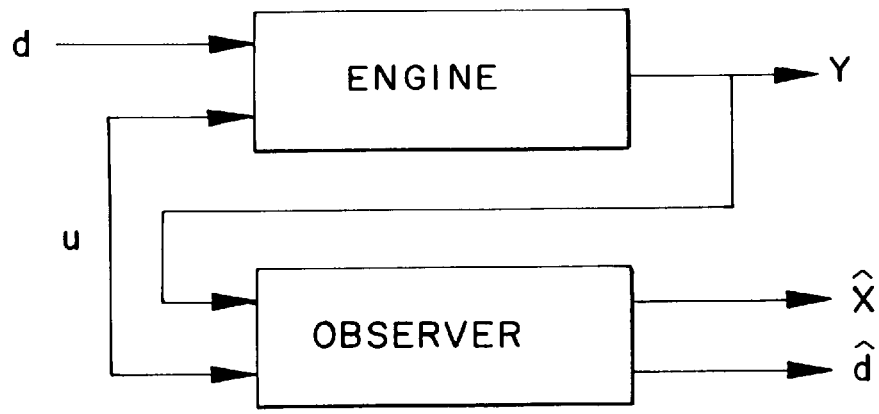
FIG. 8 is a schematic pictorial representation of an unknown input observer embodiment of the present invention.

With reference now to FIG. 8, a fundamental sketch of the preferred observer according to the instant embodiment, an unknown input observer, is illustrated. Generally, given a state space system with unknown input vector D of t:

$$\dot{x}(t) = Ax(t) + Bu(t) + Dd(t)$$

$$y(t) = Cx(t)$$

where u is a known input vector, D is a constant matrix associated with a q-dimensional unknown input vector d, the preferred unknown input observer estimates the states x as well as the unknown input d, using the measurements y and u only. In the past, unknown input observers have found wide applications in system fault detection methods and the like. The instant embodiment of the invention uses the unknown input observer method to estimate internal combustion engine crankshaft torque to monitor engine performance S4b, S5 (FIG. 2a).

The theory underlying unknown input observers is well known in the mathematical arts. In general, to design an unknown input observer for systems such as the multi-cylinder cases modeled above, the number of output measurements in the vector y must be equal to or greater than the number of unknown inputs in the vector d. Furthermore, the transmission zeros from the unknown inputs to the measurements must be stable. This is because in effect the unknown input observer performs an implicit inversion of the system, hence, the transmission zeros must be part of the observer poles, and are required to be stable for a stable observer. The remainder of the observer poles can be assigned arbitrarily to attain the desired transient responses.

Figure 9:
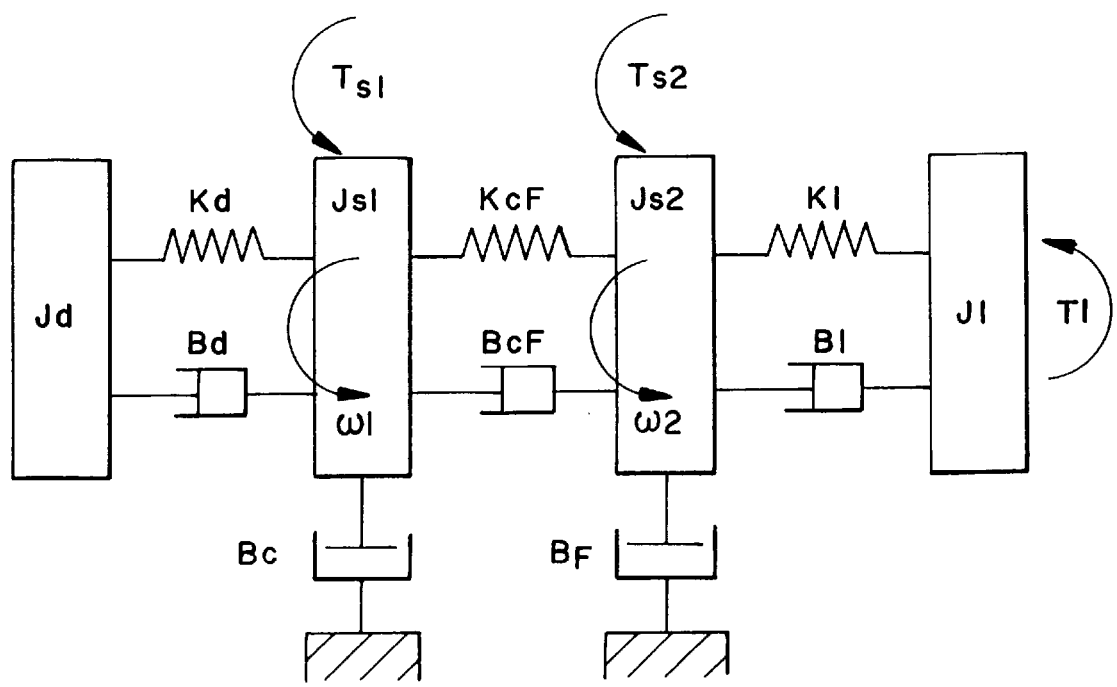
FIG. 9 is a schematic diagram model of a second internal combustion engine, drivetrain, and load combination according to the present invention.

Illustrated in FIG. 9 is a simplified two-cylinder linear engine model, coupled (on the left hand side) to a damper, and on the right to a dynamometer. The model shown in the FIGURE can be a simplified lumped-parameter representation of an engine having a greater number of cylinders and of vee "V" or in-line configuration. A detailed description of simplifying a six (6) cylinder in-line engine model into the two-cylinder model of FIG. 9 follows below.

In the model where $J_{s1}$, $J_{s2}$ are the mass moments of inertia of cylinder 1 and 2, respectively, $J_d$, $J_1$ are the mass moments of inertia of the damper and the dynamometer, respectively. $K_d$, $K_{cF}$, $K_1$ denote the torsional stiffness coefficients and $B_d$, $B_{cF}$, $B_1$, $B_c$ and $B_F$ represent structural and viscous damping coefficients. $T_{s1}$ and $T_{s2}$ are cylinder net torques, and $T_1$ is the load torque that is assumed to be measurable; $\omega_1$ and $\omega_2$ are the instantaneous speeds of the cylinder cranks assemblies.

For this four degree-of-freedom engine model (4-DOF model), let $\theta_1$, $\theta_2$, $\theta_d$, $\theta_1$ be the angular positions of the four inertias and by defining the state variables as:

$$x_1 = \theta_d,\ x_2 = \theta_1,\ x_3 = \theta_2,\ x_4 = \theta_1,$$

$x_5 = \theta_d$, $x_6 = \theta_1$, $x_7 = \theta_2$, $x_8 = \theta_1$, state-space equations are then derived as follows:

$$\dot{x}_1 = x_5$$
$$\dot{x}_2 = x_6$$
$$\dot{x}_3 = x_7$$
$$\dot{x}_3 = x_8$$
$$J_d\dot{x}_5 = -K_d(x_1 - x_2) - B_d(x_5 - x_6)$$
$$J_{s1}\dot{x}_6 = K_d(x_1 - x_2) - B_d(x_5 - x_6) + K_{cF}(x_3 - x_2) + B_{cF}(x_7 - x_6) - B_c x_6 + T_{s1}$$
$$J_{s2}\dot{x}_7 = K_1(x_4 - x_3) + B_1(x_8 - x_7) - K_{cF}(x_3 - x_2) + B_{cF}(x_7 - x_6) - B_c x_7 + T_{s2}$$
$$J_{12}\dot{x}_8 = -K_1(x_4 - x_3) - B_1(x_8 - x_7) - T_1$$

This system of equations are easily rewritten into a compact form:

$$\dot{x}(t) = Ax(t) + Bu(t) + Dd(t)$$

$$y(t) = Cx(t)$$

where the state vector $x = [x_1\ x_2\ x_3\ x_4\ x_5\ x_6\ x_7\ x_8]^T$, $u(t) = T_1$ and $d(t) = [T_{s1}\ T_{s2}]^T$. The vector y consists of measurements which determine the output matrix C.

As indicated above, two conditions must be satisfied to design an unknown input observer. To measure two individual torques, the first condition requires that the number of measurements be equal to or greater than the number of unknown inputs and each cylinder needs a speed sensor to form the output vector $$y = \begin{bmatrix} \dot{\theta}_1 \\ \dot{\theta}_2 \end{bmatrix} = \begin{bmatrix} \omega_1 \\ \omega_2 \end{bmatrix}$$

Once the sensor locations are determined, the second condition must be examined on the system. This condition requires that the transmission zeros of the 4-DOF model be stable. As is well known, for a collocated mechanical transmission system the transmission zeros are the zeros of the polynomials which are related to the substructure of the damper and dynamometer.

$$g_1(s) = J_d s^2 + B_d s + K_d$$

$$g_2(s) = J_1 s^2 + B_1 s + K_1$$

These transmission zeros are stable. Besides, it is easily shown that there are two other transmission zeros located at s=0. Fortunately, these transmission zeros at s=0 can be removed by adding two additional measurements: the angular positions of the cylinder cranks $\theta_1$ and $\theta_2$.

The above analysis shows how torque estimators are designed for two cylinder engines by means of an unknown input observer which is shown in FIG. 6.

In FIG. 8, $y = [\theta_1\ \theta_2\ \dot{\theta}_1\ \dot{\theta}_2]^T$, $d = [T_{s1}\ T_{s2}]^T$, $u = T$. The design follows the standard design procedures i.e. where as $t \rightarrow \infty$, the estimated torques $\hat{d} \rightarrow d$. Note that the derivative of the output y(t) is required, hence, the accelerations $\ddot{\theta}_1$ and $\ddot{\theta}_2$ also need to be known. However, these can be obtained from the measured speeds. It should be noted that the results obtained here are extendable to rotating machines in general.

The preferred implicit model inversion method described in the preceding section was then applied to a six-cylinder in-line engine, for which experimental data was available.

Figure 10:
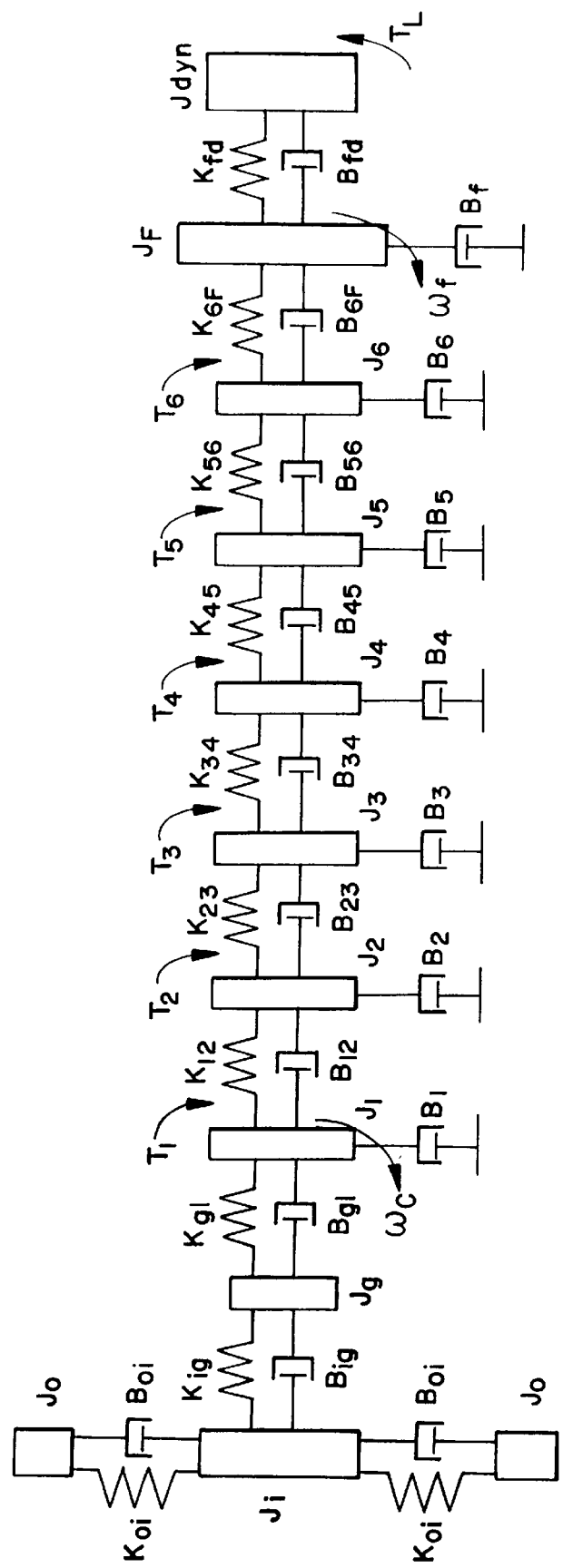
FIG. 10 is a lumped inertia mathematical model of an in-line six (6) cylinder engine; and, FIGS. 11a and 11b are torque versus time (crankshaft angle) curves for the in-line six (6) cylinder engine of FIG. 10 illustrating both measured torque and established torque curves.

FIG. 10 represents an 11 degree-of-freedom crankshaft lumped model of this engine. In the model, the six cylinders are represented in lumped form by the mass moments of inertia $J_1, \ldots, J_6$. The left-hand side of the crankshaft is connected through the gear train, denoted by the mass inertia $J_g$, to a harmonic damper. The latter is represented by a lumped outer damper inertia $J_o$ plus an inner damper inertia $J_i$. The right hand-side of the crankshaft is connected to the flywheel with the mass inertia $J_F$, and then to a dynamometer, represented by the inertia $J_{dyn}$. The couplings between the eleven mass moments of inertia are modeled as torsional stiffness and structural damping elements, for example, $k_{12}$, $B_{12}$, representing the coupling between the first and second crank. Viscous damping representing bearing and piston ring friction is also approximated by parameters $B_1, \ldots, B_6$ for each individual cylinder. Values for the model parameters were obtained in part by manufacturer published data, and in part by parameter identification techniques. This model was validated experimentally on an engine dynamometer.

Since this crankshaft has 11 degrees of freedom, the state vector x is therefore twenty two (22) dimensional:

$$x = [x_1\ x_2\ x_3\ x_4\ \ldots\ x_{19}\ x_{20}\ x_{21}\ x_{22}].$$

and $$\dot{x}(t) = Ax(t) + Bu(t) + Dd(t)$$

$$y(t) = Cx(t)$$

These state variables are the angular positions and velocities of the eleven mass moments of inertias. In addition, $u = T_L$ is the load torque which is assumed to be measured. The unknown input vector d consists of six cylinder net torques, consisting of the sum of the indicated torques plus the reciprocating torques:

$$d(t) = [T_1\ T_2\ T_3\ T_4\ T_5\ T_6].$$

The measurements form the output vector y.

From unknown input observer UIO theory, to measure six net torques, one needs at least six measurements in the output. To design an unknown input observer, a number of conditions must be satisfied. Namely, the number of output measurements in the vector y must be equal to or greater than the number of unknown inputs in the vector d. Also, the transmission zeros from the unknown inputs to the output measurements must be stable. This is in part because an implicit system inversion is preformed.

These conditions require each cylinder in the above engine to have a speed sensor. This might be impractical because of cylinders embedded in the engine block. Other than the speed measurements inside the engine block, instantaneous speeds $\omega_c$ and $\omega_f$ are measurable for the crankshaft nose and flywheel outside of the engine block. With these two measurements, only two unknown inputs can be estimated. If, however, the net torque is divided into two groups:

$$T_{S1} = T_1 + T_2 + T_3,\ \text{and}\ T_{S2} = T_4 + T_5 + T_6,$$

it is possible to estimate the torque sums $T_{S1}$ and $T_{S2}$ with these two measurements only. This lumping of the inputs into two sub-groups requires a corresponding reduction of the model order, as illustrated in the following description.

The torque sums of $T_{S1}$ and $T_{S2}$ can be obtained by reducing the 11 degree-of-freedom crankshaft model to a 4 degree-of-freedom model, resulting in a structure similar to the two-cylinder engine of FIG. 9. The model reduction is accomplished by suitably lumping inertias into groups. The inertias of the gear train and inner and outer dampers are all lumped together, which results in a total damper inertia $J_d$. The inertias of cylinders 2 and 3 are lumped to cylinder 1, resulting in a total inertia $J_{s1}=J_1+J_2+J_3$. The resultant torque sum $T_{S1}=T_1+T_2+T_3$ acts onto the lumped inertia $J_{s1}$. Furthermore, the inertias of cylinders 4, 5 and 6 are lumped to the flywheel. The resultant torque sum $T_{S2}=T_4+T_5+T_6$ acts onto the lumped 'inertia' $J_{S2}$, where $J_{S2}=J_4+J_5+J_6+J_F$. The dynamometer inertia remains the same. This modeling of course assumes that the relative oscillations between neighboring cylinders are negligible insofar as the torque estimation is concerned.

Up to this point, the reduced-order model for the six cylinder engine is equivalent, in structure, to the model of the two-cylinder engine shown in FIG. 9. Denote $\omega_1$ and $\omega_2$ the instantaneous speeds of the lumped 'inertia' $J_{S1}$ and $J_{S2}$. For the purpose of simplification, $\omega_1$ and $\omega_2$ are equal to the original crankshaft nose and flywheel speed measurements $\omega_c$ and $\omega_f$, respectively. Using these two measurements, one may estimate the torque sum $T_{S1}$ and $T_{S2}$ based on the reduced order model. The task remaining is to identify the model parameters, such that the resulting speeds $\omega_1$ and $\omega_2$ closely approximate the original crankshaft nose and flywheel speeds $\omega_c$ and $\omega_f$.

According to lumped parameter techniques in model reduction, in terms of the model parameters for the six cylinder engine in FIG. 10, the parameters $K_{cF}$, $B_{cF}$, $B_c$ and $B_F$ for the reduced crankshaft model are obtained as follows:

$$K_{cF} = 1/K_{12} + 1/K_{23} + 1/K_{34} + 1/K_{45} + 1/K_{56},$$
$$B_{cF} = B_{12} + B_{23} + B_{34} + B_{45} + B_{56},$$
$$B_C = B_1 + B_2 + B_3, B_F = B_4 + B_5 + B_6 + B_f.$$

The stiffness and damping parameters $B_d$, $K_d$, $B_1$ and $K_1$, are obtained in a similar fashion. However, validating the model suggests that the lumped stiffness parameters obtained this way are too 'flexible', and other parameters may also need some adjustment. This is done by formulating an optimization problem.

$$J(\Phi)=E\{(\omega_c(t)-\omega_1(t))^2+(\omega_f(t)-\omega_2(t))^2\}.$$

where E represents the expected value operator, and $\Phi$ represents the parameters in the 4 degree-of-freedom model to be identified. When the performance index is minimized over the parameter set, so are the speed differences between the reduced and full model. The value of the lumped parameters above can be taken as the initial conditions during this minimization. This optimization problem is performed using various optimization toolboxes in commercially available software such as the popular MATLAB program. The final parameters for the reduced model of the six cylinder engine are identified as follows:

TABLE 1

Parameters for the six cylinder engine reduced model

| | |
|---|---|
| $K_d$ = 978880 in-lb/rad | $B_d$ = 1800 in-lb-s/rad |
| $K_1$ = 100 in-lb/rad | $B_1$ = 100 in-lb-s/rad |
| $B_c$ = 22.8 in-lb-s/rad | $B_F$ = 23 in-lb-s/rad |
| $K_{cf}$ = 10000000 in-lb/rad | $B_{cf}$ = 0.6 in-lb-s/rad |

The model may be validated by generating Bode plots of the transfer functions of the full and reduced engine models. The Bode plots are confined to the frequency range of interest, within which the torque energy is concentrated. The frequency range is specified by the third harmonics of the engine firing frequency. For example, if the engine is running at 1800 RPM, this frequency range is [0–1695 (rad/sec)]. The model may further be validated by speed simulation in the time domain.

Based on the reduced model for the six cylinder engine, the torque estimator may be designed by estimating cylinder torque sums $d=[T_{S1}\ T_{S2}]$ using the measured crankshaft nose and flywheel speeds $y=[\omega_c\ \omega_f]$. Using the model parameters given in TABLE 1 above, a state-space equation for the engine reduced mode may be written, based on which, either a sixth order unknown input observer as a torque estimator, using the method in (Mueller and Hou, 1992), or a fourth order torque estimator using the method in (Symos, 1993) may be designed. If the method in Mueller and Hou, 1992 is used, a sixth-order unknown input observer is given below:

$$\dot{z}=Fz+Ny+Up$$
$$\hat{d}=E_1z+E_2y+E_3\dot{y}$$

where $$F = \begin{bmatrix} -630 & 515200 & -515200 & 0 & 0 & 0 \\ -1 & 0 & 0 & 0 & 0 & 0 \\ 0 & 0 & -80 & -100 & 0 & 0 \\ 0 & 0 & 100 & 80 & 0 & 0 \\ 0 & 0 & 0.4673 & 0 & -0.4673 & -0.4673 \\ 0 & 0 & 0 & 0 & 1 & 0 \end{bmatrix},$$

$$P = \begin{bmatrix} 0 \\ 0 \\ 0 \\ 0 \\ -0.0047 \\ 0 \end{bmatrix} \quad N = \begin{bmatrix} 0 & 0 & 631.5798 & 0 \\ 0 & 0 & 0 & 0 \\ 100 & 80 & 0 & 1 \\ -80 & 100 & -1 & 0 \\ 0 & 0 & 0 & 0.4673 \\ 0 & 0 & 0 & 0 \end{bmatrix},$$

$$E_3 = \begin{bmatrix} 0 & 0 & 9.16 & 0 \\ 0 & 0 & 0 & 126.66 \end{bmatrix}$$

$$[E_1\ E_2]/e+07 = \begin{bmatrix} -0.0001 & 0.0979 & -1.0 & -1.0979 & 0 & 0 & 0 & 0.0001 & 0 \\ 0 & 0 & 1.0 & 1.0 & -0.00001 & 0 & 0 & 0 & -0.0000626 \end{bmatrix}$$

Figure 11A:
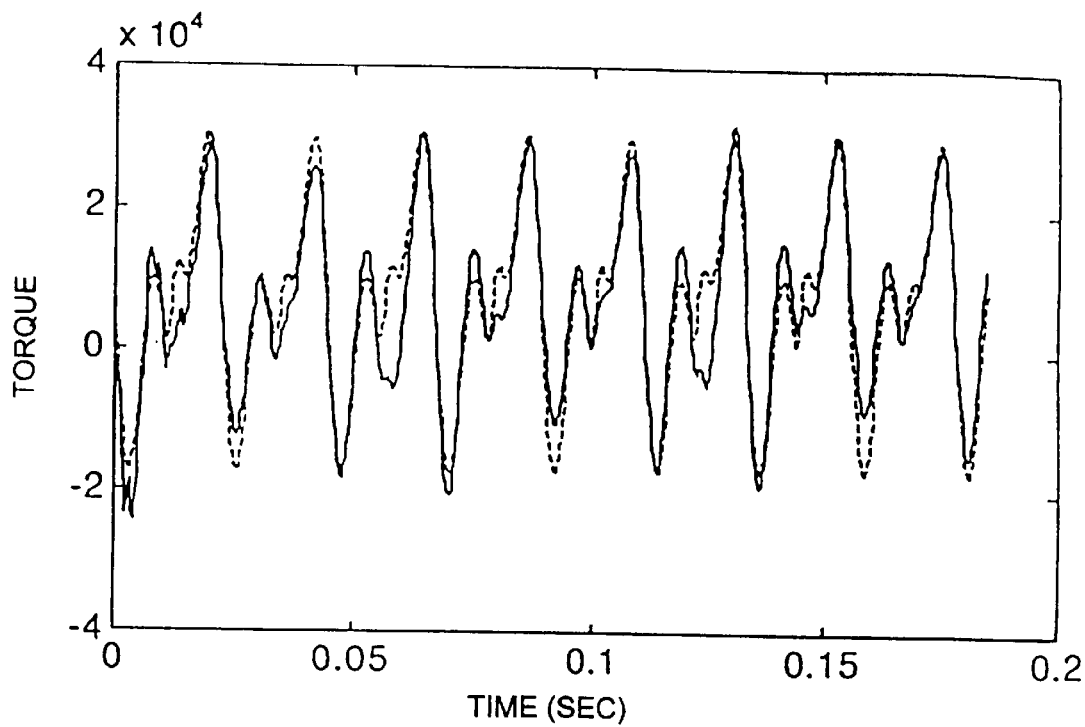
Figure 11B:
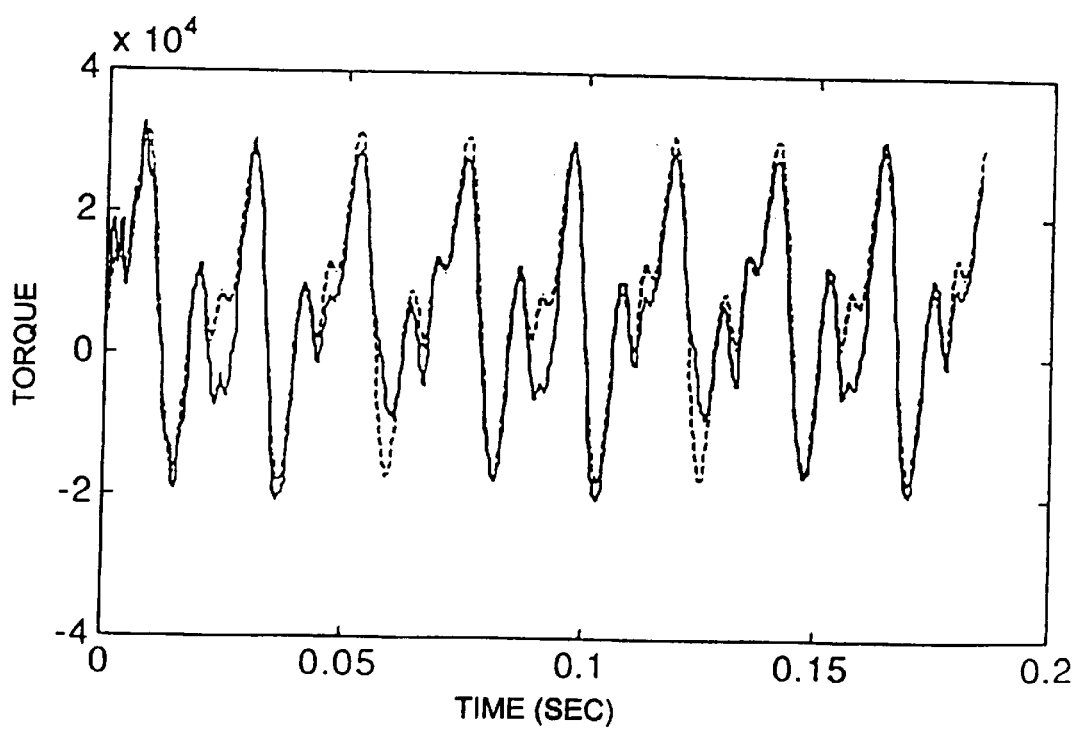

FIGS. 11a and 11b are simulation curves to test if the torque estimator works for the reduced mode. The crankshaft nose speed flywheel speed at 1800 RPM are used as the inputs to the estimator. FIGS. 11a and 11b compare the measured and estimated torques, the dashed curves representing the measured torque sums, which are calculated from the pressure signals generated by pressure transducers placed in the cylinders, plus the reciprocating torques, which can be computed from knowledge of engine geometry. The solid curves represent the estimate of the torque sums $T_{S1}$ and $T_{S2}$. The estimation results are fairly good. At the beginning of the observation, there is some transient if the observer initial conditions are inconsistent with those of the engine. However, this transient dies away reasonably quickly. Finally, if the reciprocating torques are subtracted from the torque sum, a fairly accurate estimate of the indicated torque sums is obtained.

The invention has been described with reference to the preferred embodiments. Modifications and alterations will occur to others upon reading and understanding of this specification. It is my intention to include all such modifications and alternations insofar as they come within the scope of the appended claims or equivalents thereof.

Having thus described the invention, I now claim:

1. A method of reconstructing combustion torques produced by individual combustion events in an internal combustion engine, the method comprising the steps of:

obtaining a first set of measured outputs including a first set y of measured outputs from at least one of an engine and drivetrain of the internal combustion engine by determining instantaneous angular velocity of the at least one of the engine and drivetrain at a first set of preselected points along the at least one of the engine and drivetrain;

providing a dynamic mathematical model of an engine assembly of the internal combustion engine relating a fist set of net individual cylinder torques to a first set of outputs of the internal combustion engine, by providing an unknown-input state space model:

$$\dot{x}(t)=f(x(t), u(t), d(t))$$
$$y(t)=g(x(t), u(t), d(t))$$

relating a first set of unknown combustion torques d(t) to a first set of measured outputs y(t), wherein x(t) is a state vector and u(t) is a known input vector;

reconstructing a first set of estimated net individual cylinder torques by inverting said mathematical model and applying said first set of measured outputs to the inverted mathematical model according to an implicit inversion of said unknown-input state space model based on at least one of an input observer and input estimates; and, performance of the internal combustion engine based upon the estimated net individual cylinder torques.

2. The method according to claim 1 wherein the step of providing said unknown-input state space model includes providing a linear unknown-input observer model;

$$\dot{x}(t)=A\ x(t)+Bu(t)+D\ d(t)$$
$$y(t)=C\ x(t)$$

wherein D is a constant matrix associated with a q-dimensional unknown input vector d, x is states of the unknown-input state space model, y is a measured output vector, u is a measured input vector, A represents system dynamics, B represents known inputs distribution, and C represents an output measurement matrix.

3. The method according to claim 2 wherein the step of obtaining said first set y of measured outputs includes determining an angular position of said at least one of said engine and drivetrain of the internal combustion engine.

4. The method according to claim 2 wherein the step of obtaining said first set y of measured outputs includes determining an angular torque of said at least one of said engine and drivetrain of the internal combustion engine.

5. The method according to claim 2 wherein the step of obtaining said first set y of measured outputs includes determining an angular acceleration of said at least one of said engine and drivetrain of the internal combustion engine.

6. The method according to claim 2 wherein the step of obtaining said first set y of measured outputs includes determining a shaft torque measurement of said at least one of said engine and drivetrain of the internal combustion engine.

7. The method according to claim 2 wherein the step of obtaining said first set y of measured outputs includes determining at least one of an angular position, an angular torque, an angular acceleration and a shaft torque measurement of said at least one of said engine and drivetrain of the internal combustion engine.

8. A method of reconstructing combustion torques produced by individual combustion events in an internal combustion engine, the method comprising the steps of:

obtaining a first set of measured outputs Y(s) from a rotating member in the internal combustion engine, said step of obtaining including the substep of determining at least one of an angular position, an angular torque, an angular acceleration and a shaft torque measurement of at least one of an engine and a drivetrain of the internal combustion engine;

providing a dynamic mathematical model of an engine assembly of the internal combustion engine relating a fist set of net individual cylinder torques to a first set of outputs of the internal combustion engine, by providing a transfer function model H(s) of the internal combustion engine, the transfer function odel H(s) relating a first set of net individual cylinder torques X(s) to said first set of outputs Y(s) of the internal combustion engine;

reconstructing a first set of estimated net individual cylinder torques by inverting said mathematical model and applying said first set of measured outputs to the inverted mathematical model, including explicitly inverting said transfer function model H(s) and applying said first set of measured outputs to the inverted model according to $\hat{X}(s)=H^{-1}(s)\ Y(s)$; and, monitoring performance of the internal combustion engine based upon the estimated net individual cylinder torques.

9. A method of estimating combustion torques produced by combustion events in an internal combustion engine, the method comprising:

sampling a first set of measured outputs from a moving member in the internal combustion engine;

providing an inverted mathematical model of an engine rotating assembly of the internal combustion engine relating a first set of net individual cylinder torques to a first set of outputs of the internal combustion engine, said step of providing including providing an unknown-input state space model;

$$\dot{x}(t)=f(x(t), u(t), d(t))$$
$$y(t)=g(x(t), u(t), d(t))$$

relating a first set of combustion torques d(t) to a first set of outputs y(t), wherein x(t) is a state vector and u(t) is a known input vector;

reconstructing a first of estimated net individual cylinder torques by applying said first set of measured outputs to the inverted mathematical model; and, monitoring performance of the internal combustion engine based upon the estimated net individual cylinder torques.

10. The method according to claim 9 wherein the step of providing said unknown-input state space model includes providing a linear unknown-input observer model:

$$\dot{x}(t)=A\ x(t)+Bu(t)+Dd(t)$$
$$y(t)=C\ x(t)$$

wherein D is a constant matrix associated with a q-dimensional unknown input vector d, x is states of the unknown-input state space model, y is a measured output vector, u is a measured input vector, A represents system dynamics, B represents known inputs distribution, and C represents an output measurement matrix.

11. A method of estimating combustion torques produced by combustion events in an internal combustion engine to monitor performance of the internal combustion engine, the method comprising:

sampling a first set of measured outputs from a moving member in the internal combustion engine;

providing an inverted transfer function mathematical model $H^{-1}(s)$ of an engine rotating assembly of the internal combustion engine, the inverted transfer function mathematical model relating a first set of net individual cylinder torques $X(s)$ to a first set of measured outputs $Y(s)$ of the internal combustion engine;

reconstructing a first of estimated net individual cylinder torques by applying said first set of measured outputs $Y(s)$ to the inverted mathematical model according to $\hat{X}(s)=H^{-1}(s) Y(s)$, wherein said step of reconstructing including the substep of forming a plurality of look-up tables, each of the plurality of look-up tables containing transfer function model parameters relating a respective plurality of first sets of net individual cylinder torques with a corresponding plurality of first sets of measured outputs of the internal combustion engine; and monitoring the performance of the internal combustion engine based on the estimated combustion torques.

12. The method according to claim 11 wherein the step of forming said plurality of look-up tables includes forming each of the plurality of look-up tables to reflect a different operating condition of the internal combustion engine.

13. The method according to claim 12 wherein the step of forming each of the plurality of look-up tables includes forming each of the plurality of look-up tables to reflect a different operating condition of the internal combustion engine including at least an engine mean speed condition and throttle position condition.

14. The method according to claim 11 wherein the step of forming said plurality of look-up tables includes forming each of the plurality of look-up tables to reflect a different state of an operating condition of the internal combustion engine.

15. The method according to claim 14 wherein the step of forming each of the plurality of look-up tables includes forming each of the plurality of look-up tables to reflect a different state of a single operating condition of the internal combustion engine including an engine mean speed condition and throttle position condition.

16. An apparatus for reconstructing combustion torques produced by individual combustion events in an internal combustion engine, the apparatus comprising:

a set of sensors for obtaining a first set of measured outputs from a rotating member in the internal combustion engine, said set of sensors including means for obtaining a first set y of measured outputs from at least one of an engine and drivetrain of the internal combustion engine by determining instantaneous angular velocity of the at least one of the engine and drivetrain at a first set of preselected points along the at least one of the engine and drivetrain;

mathematical model providing means for providing a dynamic mathematical model of an engine rotating assembly of the internal combustion engine, the mathematical model relating a is first set of net individual cylinder torques to a first set of outputs of the internal combustion engine, said mathematical model providing means including means for providing an unknown-input state space model:

$\dot{x}(t)=f(x(t), u(t), d(t))$ $y(t)=g(x(t), u(t), d(t))$ relating a first set of unknown combustion torques $d(t)$ to a first set of measured outputs $y(t)$, wherein $x(t)$ is a state vector and $u(t)$ is a known input vector; and, reconstructing means for reconstructing a first set of estimated net individual cylinder torques by inverting said mathematical model and applying said first set of measured outputs to the inverted mathematical model, said reconstructing means including means for performing an implicit inversion of said unknown-input state space model using at least one of an input observer and input estimates.

17. An apparatus for reconstructing combustion torques produced by individual combustion events in an internal combustion engine, the apparatus comprising:

a set of sensors for obtaining a first set of measured outputs including means for obtaining a first set of measured outputs $Y(s)$ from said rotating member in an internal combustion engine;

mathematical model providing means for providing a dynamic mathematical model of an engine rotating assembly of the internal combustion engine, said mathematical model providing means including means for providing a transfer function model $H(s)$ of the internal combustion engine, the transfer function model $H(s)$ relating said first set of net individual cylinder torques $X(s)$ to a first set of outputs $Y(s)$ of the internal combustion engine; and, reconstructing means for reconstructing a first set of estimated net individual cylinder torques by inverting said mathematical model and applying said first set of measured outputs to the inverted mathematical model, said reconstructing means including means for explicitly inverting said transfer function model $H(s)$ and applying said first set of measured outputs to the inverted model according to $\hat{X}(s)=H^{-1}(s) Y(s)$.

* * * * *

UNITED STATES PATENT AND TRADEMARK OFFICE
Certificate

Patent No. 5,771,482                                                               Patented: June 23, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Giorgio Rizzoni, Upper Arlington, Ohio and Francis T. Connolly, Ann Arbor, Mich.

Signed and Sealed this First Day of December, 1998.

WILLIAM A. CUCHLINSKI, JR.
*Supervisory Patent Examiner*
Art Unit 3661